(12) United States Patent
Angelovski et al.

(10) Patent No.: US 10,262,377 B2
(45) Date of Patent: Apr. 16, 2019

(54) SALES ORDER DATA COLLECTION AND MANAGEMENT SYSTEM

(71) Applicant: MACE ENGINEERING GROUP PTY. LTD., Lalor (AU)

(72) Inventors: Steven Angelovski, Victoria (AU); Valentin Angelovski, Lalor (AU); Yen Ha Le Nguyen, Eltham (AU)

(73) Assignee: MACE ENGINEERING GROUP PTY LTD., Lalor, Victoria (AU)

( * ) Notice: Subject to any disclaimer, the term of this patent is extended or adjusted under 35 U.S.C. 154(b) by 1044 days.

(21) Appl. No.: 14/483,178

(22) Filed: Sep. 11, 2014

(65) Prior Publication Data
US 2015/0081485 A1  Mar. 19, 2015

(30) Foreign Application Priority Data

Sep. 13, 2013 (AU) ................................ 2013903525

(51) Int. Cl.
*G06Q 10/10* (2012.01)
*G06Q 40/00* (2012.01)
(Continued)

(52) U.S. Cl.
CPC ............ *G06Q 40/12* (2013.12); *G06Q 10/08* (2013.01); *G06Q 10/10* (2013.01); *G06Q 30/0201* (2013.01)

(58) Field of Classification Search
CPC .............. G06Q 30/0282; G06Q 30/06; G06Q 30/0603; G06Q 30/0621; G06Q 30/0627;
(Continued)

(56) References Cited

U.S. PATENT DOCUMENTS 7,058,645 B2 * 6/2006 Seto ................ G06F 17/30914
7,426,548 B2    9/2008 Griffin et al.
(Continued)

FOREIGN PATENT DOCUMENTS

AU    2001239010 B2    9/2001
AU    2005256523 B2    1/2006
(Continued)

OTHER PUBLICATIONS https://web.archive.org/web/20110122153718/https://www.emailvendorselection.com/api-application-programming-interface/ (Year: 2011).*
(Continued)

*Primary Examiner* — Florian M Zeender
*Assistant Examiner* — Dana Amsdell
(74) *Attorney, Agent, or Firm* — Ashok Tankha; Lipton, Weinberger & Husick

(57) ABSTRACT

A computer implemented method and a sales order data collection and management system (SODCMS) collect and manage sales order data including data from a web based sales order, a manual sales order, a sales order over a communication device, a third party consumer to consumer web based sales order, etc. The SODCMS receives sales order data from one or more sources and categorizes the sales order data based on a source type. The SODCMS parses the categorized sales order data based on filtering criteria, stores the parsed sales order data in one or more databases, and validates the stored sales order data against validation criteria. The SODCMS processes the validated sales order data and transmits the processed sales order data to a resource management platform. The SODCMS renders messages on modifications and discrepancies associated with the sales order data to consumers based on the validation of the sales order data.

38 Claims, 65 Drawing Sheets

(51) Int. Cl.
*G06Q 30/02* (2012.01)
*G06Q 10/08* (2012.01)
G06F 16/00 (2019.01)
G06F 17/00 (2019.01)

(58) Field of Classification Search
CPC ............ G06F 17/30592; G06F 17/243; G06F 21/629; G06F 8/38; G06F 8/40; G06F 9/451
See application file for complete search history.

(56) References Cited

U.S. PATENT DOCUMENTS

| | | | |
|---|---|---|---|
| 7,685,139 B2 | 3/2010 | Atkinson et al. | |
| 7,698,634 B2* | 4/2010 | Bhatia | G06F 17/30917 715/239 |
| 7,840,895 B2* | 11/2010 | Bhatia | G06F 17/30917 707/763 |
| 7,904,333 B1* | 3/2011 | Perkowski | G06F 17/30879 705/14.4 |
| 8,190,494 B2 | 5/2012 | Fjellanger et al. | |
| 8,347,214 B2* | 1/2013 | Dillon | G06F 9/541 715/744 |
| 8,768,877 B2* | 7/2014 | Bhatia | G06F 17/30893 707/601 |
| 9,361,606 B2* | 6/2016 | Hertel | G06Q 20/02 |
| 9,667,704 B1* | 5/2017 | Sonawane | H04L 67/10 |
| 2003/0018608 A1* | 1/2003 | Rice | G06F 21/14 |
| 2003/0217035 A1 | 11/2003 | Lai | |
| 2003/0229545 A1* | 12/2003 | Veres | G06Q 30/02 705/27.1 |
| 2004/0060004 A1* | 3/2004 | Mani | G06F 17/3092 715/239 |
| 2004/0167986 A1* | 8/2004 | Gilfix | G06F 9/546 709/230 |
| 2004/0193506 A1* | 9/2004 | Zmolek | G06Q 10/10 705/26.1 |
| 2004/0243501 A1 | 12/2004 | Duffey, Jr. | |
| 2004/0260535 A1* | 12/2004 | Chen | G06F 9/543 704/9 |
| 2004/0267803 A1* | 12/2004 | Zhou | G06F 17/2247 |
| 2005/0149536 A1* | 7/2005 | Wildes | G06F 8/20 |
| 2005/0155017 A1* | 7/2005 | Berstis | G06F 17/24 717/114 |
| 2005/0182773 A1* | 8/2005 | Feinsmith | G06Q 10/10 |
| 2005/0198352 A1* | 9/2005 | Fleck | H04L 29/06 709/232 |
| 2005/0240905 A1* | 10/2005 | Pournasseh | G06F 9/454 717/136 |
| 2005/0246357 A1* | 11/2005 | Geary | G06F 17/30592 |
| 2005/0257125 A1* | 11/2005 | Roesner | G06F 8/40 715/237 |
| 2005/0275876 A1* | 12/2005 | McLean | G06F 3/1204 358/1.15 |
| 2006/0156314 A1* | 7/2006 | Waldorf | G06F 9/4484 719/328 |
| 2006/0248506 A1* | 11/2006 | Luo | G06F 8/38 717/104 |
| 2008/0222098 A1 | 9/2008 | Simpson | |
| 2009/0030810 A1* | 1/2009 | Komenda | G06Q 30/0603 705/26.81 |
| 2010/0121775 A1* | 5/2010 | Keener, Jr. | G06Q 30/02 705/347 |
| 2010/0241492 A1* | 9/2010 | Eglen | G06Q 30/02 705/4 |
| 2012/0323663 A1* | 12/2012 | Leach | G06Q 30/0239 705/14.25 |
| 2013/0115972 A1* | 5/2013 | Ziskind | H04W 4/21 455/456.2 |
| 2014/0180826 A1* | 6/2014 | Boal | G06Q 30/0245 705/14.66 |
| 2014/0189483 A1* | 7/2014 | Awan | H04L 63/08 715/212 |
| 2015/0317656 A1* | 11/2015 | Baranski-Walker | G06Q 30/02 705/7.34 |

FOREIGN PATENT DOCUMENTS

| | | |
|---|---|---|
| WO | WO2000048053 A2 | 8/2000 |
| WO | WO2002010885 A2 | 2/2002 |
| WO | WO 2009/048637 A2 | 4/2009 |

OTHER PUBLICATIONS

Automated order management for ERP—Esker DeliveryWare [retrieved from internet on Feb. 26, 2015] <URL: https://web.archive.org/web/20130427184848/http://esker.com.au/solutions/dpa-sales_order_processing.asp > published on Apr. 27, 2013 as per Wayback Machine and further link from this webpage on the same web-site.
Dynamic Document Capture (DDC)—Esker DeliveryWare [retrieved from internet on Feb. 26, 2015] URL:https://web.archive.org/web/20130425124325/http://esker.com.au/technologies/dynamic_document_capture.asp published on Apr. 25, 2013 as per Wayback Machine.

* cited by examiner

WELCOME TO SALES ORDER DATA COLLECTION AND MANAGEMENT APPLICATION

| WEBSITE ORDER | COUNT |
|---|---|
| PENDING | 24 |
| PROCESSED | 33 |
| TOTAL | 57 |

| EBAY ORDER | COUNT |
|---|---|
| PENDING | 22 |
| PROCESSED | 14 |
| TOTAL | 36 |

| MANUAL ORDER | COUNT |
|---|---|
| PENDING | 1 |
| PROCESSED | 10 |
| TOTAL | 11 |

WEBSITE ORDERS
ALL ORDERS
PROCESSED ORDERS
PENDING ORDERS
  EBAY ORDERS
ALL ORDERS
PROCESSED ORDERS
PENDING ORDERS
  EBAY INCOMPLETE
  MANUAL ORDERS
ALL ORDERS
PROCESSED ORDERS
PENDING ORDERS
CREATE MANUAL ORDERS
  QUOTES
ALL QUOTES
CREATE QUOTE
  VIEW PAYMENTS
CREDIT CARD/EWAY
PAYPAL DIRECT
PAYPAL ECHEQUE
CASH PAYMENT
BANK DEPOSIT

FIG. 7A

WEBSITE ORDERS

ALL ORDERS

PROCESSED ORDER

PENDING ORDER

EBAY ORDERS

ALL ORDERS

PROCESSED ORDERS

PENDING ORDERS

EBAY INCOMPLETE

ALL ORDERS

MANUAL ORDERS

ALL ORDERS

PROCESSED ORDERS

PENDING ORDERS

CREATE MANUAL ORDERS

QUOTES

ALL QUOTES

CREATE QUOTE

VIEW PAYMENTS

CREDIT CARD/EWAY

PAYPAL DIRECT

PAYPAL ECHEQUE

CASH PAYMENT

BANK DEPOSIT

FIG. 7B

| WEBSITE ORDER | COUNT | | EBAY ORDER | COUNT | | MANUAL ORDER | COUNT |
|---|---|---|---|---|---|---|---|
| PENDING | 24 | | PENDING | 22 | | PENDING | 1 |
| PROCESSED | 33 | | PROCESSED | 14 | | PROCESSED | 10 |
| TOTAL | 57 | | TOTAL | 36 | | TOTAL | 11 |

FIG. 7C

EMAIL ORDER LIST

| ORDER NUMBER | BILLING CLIENT NAME | ORDER DATE | PAID | ADDRESS VERIFIED | PHONE | EMAIL | PAYMENT MODE |
|---|---|---|---|---|---|---|---|
| 4050 | CLIENT 1 | 08/07/2013 | X | ✓ | | Client1@gmail.com | |
| 4049 | CLIENT 2 | 08/07/2013 | ✓ | ✓ | | Client2@tpg.com.au | PAYPAL DIRECT |
| 4048 | CLIENT 3 | 08/07/2013 | X | ✓ | | Client3@gmail.com | |
| 4047 | CLIENT 4 | 07/07/2013 | ✓ | X | | Client4@gmail.com | PAYPAL DIRECT |
| 4046 | CLIENT 5 | 07/07/2013 | X | ✓ | | Client5@hotmail.com | |
| 4045 | CLIENT 6 | 07/07/2013 | ✓ | ✓ | 0432400842 | Client6@gmail.com | EWAY |
| 4044 | CLIENT 7 | 06/07/2013 | ✓ | X | 0457268525 | Client7@live.com.au | PAYPAL DIRECT |

HOME   PROCESSED ORDERS   PENDING ORDERS

FIG. 9B

🏠 HOME     ALL ORDERS     PENDING ORDERS

PROCESSED ORDERS

| ORDER NUMBER | BILLING CLIENT NAME | ORDER DATE | PAID | ADDRESS VERIFIED | PHONE | EMAIL | PAYMENT MODE |
|---|---|---|---|---|---|---|---|
| 4049 | CLIENT 2 | 08/07/2013 | ✓ | ✓ | | Client2@tpg.com.au | PAYPAL DIRECT |
| 4045 | CLIENT 6 | 07/07/2013 | ✓ | ✓ | 0432400842 | Client6@gmail.com | EWAY |
| 4043 | CLIENT 8 | 06/07/2013 | ✓ | ✓ | 61423381900 | Client8@perthipsol.com.au | EWAY |
| 4042 | CLIENT 9 | 06/07/2013 | ✓ | ✓ | | Client9@gmail.com | PAYPAL DIRECT |
| 4041 | CLIENT 5 | 05/07/2013 | ✓ | ✓ | 0406211002 | Client5@hotmail.com | EWAY |

FIG. 9C

🏠 HOME     ALL ORDERS     PROCESSED ORDERS

PENDING ORDERS

| ORDER NUMBER | BILLING CLIENT NAME | ORDER DATE | PAID | ADDRESS VERIFIED | PHONE | EMAIL | PAYMENT MODE |
|---|---|---|---|---|---|---|---|
| 4050 | CLIENT 1 | 08/07/2013 | x | ✓ | | Client1@gmail.com | |
| 4048 | CLIENT 3 | 08/07/2013 | x | ✓ | | Client3@gmail.com | |
| 4047 | CLIENT 4 | 07/07/2013 | ✓ | x | | Client4@gmail.com | PAYPAL DIRECT |
| 4046 | CLIENT 5 | 07/07/2013 | x | ✓ | | Client5@hotmail.com | |
| 4044 | CLIENT 7 | 06/07/2013 | ✓ | x | 0011222334 | Client7@live.com.au | PAYPAL DIRECT |

FIG. 9D

| | | | | | | | | | |
|---|---|---|---|---|---|---|---|---|---|
| 🏠HOME | PROCESSED ORDERS | | PENDING ORDERS | | | | | | |

EBAY ORDER LIST

| ORDER ID | BUYER | ORDER DATE | TOTAL | PAID | ADDITIONAL PAYMENT | ADDRESS VERIFIED | PARTS CONFIRMED | PARTS FOUND | STATUS | PAYMENT MODE |
|---|---|---|---|---|---|---|---|---|---|---|
| 251298533477-1261021948015 | BUYER 1 | 07/07/2013 | 59.0 | ✓ | ✓ | X | ✓ | ✓ | PENDING | PAYPAL |
| 251300791173-1260973766015 | BUYER 2 | 07/07/2013 | 292.0 | ✓ | ✓ | X | ✓ | ✓ | PENDING | PAYPAL |
| 251297956663-1260022787015 | BUYER 3 | 05/07/2013 | 110.0 | ✓ | ✓ | X | ✓ | X | PENDING | PAYPAL |
| 400503348169-2487995502027 | BUYER 4 | 08/06/2013 | 292.0 | ✓ | ✓ | ✓ | ✓ | ✓ | PROCESSED | PAYPAL |
| 400505964509-2495058848027 | BUYER 5 | 10/06/2013 | 165.0 | ✓ | ✓ | ✓ | ✓ | ✓ | PROCESSED | PAYPAL |
| 400486779957-2498890100027 | BUYER 6 | 11/06/2013 | 43.0 | ✓ | ✓ | ✓ | ✓ | ✓ | PROCESSED | PAYPAL |

FIG. 10B

| | | | | | | | | | |
|---|---|---|---|---|---|---|---|---|---|
| HOME | ALL ORDERS | PENDING ORDERS | | | | | | | |

EBAY ORDER LIST

| ORDER ID | BUYER | ORDER DATE | TOTAL | PAID | ADDITIONAL PAYMENT | ADDRESS VERIFIED | PARTS CONFIRMED | PARTS FOUND | STATUS | PAYMENT MODE |
|---|---|---|---|---|---|---|---|---|---|---|
| 4005033481196-248799502027 | BUYER 4 | 08/06/2013 | 292.0 | ✓ | ✓ | ✓ | ✓ | ✓ | PROCESSED | PAYPAL |
| 400505964509-249505848027 | BUYER 5 | 10/06/2013 | 165.0 | ✓ | ✓ | ✓ | ✓ | ✓ | PROCESSED | PAYPAL |
| 400486779957-249889010027 | BUYER 6 | 11/06/2013 | 43.0 | ✓ | ✓ | ✓ | ✓ | ✓ | PROCESSED | PAYPAL |
| 400502004601-248154699027 | BUYER 7 | 06/06/2013 | 217.0 | ✓ | ✓ | ✓ | ✓ | ✓ | PROCESSED | PAYPAL |
| 251288055392-125091645015 | BUYER 8 | 17/06/2013 | 235.0 | ✓ | ✓ | ✓ | ✓ | ✓ | PROCESSED | PAYPAL |
| 251288934883-125142552015 | BUYER 9 | 18/06/2013 | 150.0 | ✓ | ✓ | ✓ | ✓ | ✓ | PROCESSED | PAYPAL |

FIG. 10C

🏠HOME    ALL ORDERS    PROCESSED ORDERS

EBAY ORDER LIST

| ORDER ID | BUYER | ORDER DATE | TOTAL | PAID | ADDITIONAL PAYMENT | ADDRESS VERIFIED | PARTS CONFIRMED | PARTS FOUND | STATUS | PAYMENT MODE |
|---|---|---|---|---|---|---|---|---|---|---|
| 251298533477-1261021948015 | BUYER 1 | 07/07/2013 | 59.0 | ✓ | ✓ | X | ✓ | ✓ | PENDING | PAYPAL |
| 251300791173-1260973766015 | BUYER 2 | 07/07/2013 | 292.0 | ✓ | ✓ | X | ✓ | ✓ | PENDING | PAYPAL |
| 251297956663-1260022787015 | BUYER 3 | 05/07/2013 | 110.0 | ✓ | ✓ | X | ✓ | X | PENDING | PAYPAL |
| 400506615378-250130107027 | BUYER 10 | 12/06/2013 | 165.0 | ✓ | ✓ | X | X | ✓ | PENDING | PAYPAL |
| 400505964579-250084865027 | BUYER 11 | 11/06/2013 | 292.0 | ✓ | ✓ | X | X | ✓ | PENDING | PAYPAL |
| 400488845697-242344690027 | BUYER 12 | 21/05/2013 | 217.0 | ✓ | ✓ | X | X | ✓ | PENDING | PAYPAL |

FIG. 10D

MANUAL ORDERS

ALL ORDERS
PROCESSED ORDERS
PENDING ORDERS
CREATE MANUAL ORDERS

FIG. 11A

| 🏠 HOME | PROCESSED ORDERS | PENDING ORDERS | NEW MANUAL ORDER | | | | |
|---|---|---|---|---|---|---|---|

MANUAL ORDER LIST

| FULL NAME | PAID | ADDRESS VERIFIED | ORDER DATE | PAYMENT DUE | EMAIL | ACCOUNT | PAYMENT MODE | INVOICE ID |
|---|---|---|---|---|---|---|---|---|
| CONSUMER 1 | X | ✓ | 08/07/2013 | 08/07/2013 | Consumer1@gmail.com | CS | | C13002(Print) |
| CONSUMER 2 | ✓ | ✓ | 08/07/2013 | 08/07/2013 | Consumer2@hotmail.com | CS | PAYPAL DIRECT | C13001(Print) |
| CONSUMER 3 | ✓ | ✓ | 08/07/2013 | 08/07/2013 | Consumer3@hotmail.com | CS | PAYPAL CHEQUE | |
| CONSUMER 4 | ✓ | ✓ | 08/07/2013 | 08/07/2013 | Consumer4@bigpond.com | CS | BANK DEPOSIT | |
| CONSUMER 5 | ✓ | ✓ | 08/07/2013 | 08/07/2013 | Consumer5@perthipsol.com.au | CS | PAYPAL eCHEQUE | |

FIG. 11B

| ⌂ HOME | ALL ORDERS | PENDING ORDERS | NEW MANUAL ORDER | | | |
|---|---|---|---|---|---|---|

MANUAL ORDER LIST

| FULL NAME | PAID | ADDRESS VERIFIED | PAYMENT DUE | EMAIL | ACCOUNT | PAYMENT MODE | INVOICE ID |
|---|---|---|---|---|---|---|---|
| CONSUMER 6 | ✓ | ✓ | 08/07/2013 | Consumer6@hotmail.com | CS | PAYPAL DIRECT | C13002(Print) |
| CONSUMER 7 | ✓ | ✓ | 08/07/2013 | Consumer7@hotmail.com | CS | PAYPAL eCHEQUE | |
| CONSUMER 8 | ✓ | ✓ | 08/07/2013 | Consumer8@gmail.com | CS | BANK DEPOSIT | |
| CONSUMER 9 | ✓ | ✓ | 08/07/2013 | Consumer9@yahoo.com.au | CS | PAYPAL eCHEQUE | |
| CONSUMER 10 | ✓ | ✓ | 08/07/2013 | Consumer10@hotmail.com.au | CS | BANK DEPOSIT | |
| CONSUMER 11 | ✓ | ✓ | 08/07/2013 | Consumer11@gmail.com | CS | CREDIT CARD (EWAY) | |

FIG. 11C

SALES ORDER DATA COLLECTION AND MANAGEMENT APPLICATION    WELCOME: ADMIN    SETTINGS    SIGN OUT

🏠 HOME    ALL ORDERS    PROCESSED ORDERS    NEW MANUAL ORDER    [CONSUMER NAME ▶]

MANUAL ORDER LIST

| FULL NAME | PAID | ADDRESS VERIFIED | ORDER DATE | EMAIL | ACCOUNT | PAYMENT MODE | INVOICE ID |
|---|---|---|---|---|---|---|---|
| CONSUMER 1 | X | ✓ | 08/07/2013 | Consumer1@gmail.com | CS | | C13002(Print) |

QUOTES
ALL QUOTES
CREATE QUOTE

VIEW PAYMENTS

CREDIT CARD/EWAY

PAYPAL DIRECT

PAYPAL ECHEQUE

CASH PAYMENT

BANK DEPOSIT

FIG. 13A

★ HOME

EWAY PAYMENT LIST

| ORDER REFERENCE | CONSUMER NAME | TRANSACTION ID | ORDER DATE | PAYMENT DATE | ORDER TOTAL | ORDER TYPE |
|---|---|---|---|---|---|---|
| 5 | CONSUMER 14 | KJHGF | 08/07/2013 | 08/07/2013 | AUD$157.64 | MANUAL |
| 4045 | CLIENT 6 | 881644916 | 07/07/2013 | 07/07/2013 | AUD$745.00 | WEB |
| 4043 | CONSUMER 10 | 881120880 | 06/07/2013 | 06/07/2013 | AUD$657.00 | WEB |
| 4041 | CONSUMER 15 | 880049272 | 05/07/2013 | 05/07/2013 | AUD$43.00 | WEB |
| 4040 | CONSUMER 16 | 877993659 | 04/07/2013 | 04/07/2013 | AUD$180.00 | WEB |
| 4031 | CONSUMER 17 | 877865027 | 02/07/2013 | 02/07/2013 | AUD$147.00 | WEB |
| 4028 | CONSUMER 18 | 877841910 | 02/07/2013 | 02/07/2013 | AUD$165.00 | WEB |
| 4027 | CONSUMER 19 | 877827415 | 02/07/2013 | 02/07/2013 | AUD$32.00 | WEB |
| 4026 | CONSUMER 20 | 877826766 | 02/07/2013 | 02/07/2013 | AUD$160.00 | WEB |
| 4024 | CONSUMER 21 | 877778576 | 01/07/2013 | 01/07/2013 | AUD$292.00 | WEB |

FIG. 13B

PAYPAL PAYMENT LIST

| ORDER REFERENCE | MEMBER ID | TRANSACTION ID | ORDER DATE | PAYMENT DATE | ORDER TOTAL | ORDER TYPE |
|---|---|---|---|---|---|---|
| 10 | Consumer22@hotmail.com | 987654 | 08/07/2013 | 08/07/2013 | AUD$11.0 | MANUAL |
| 4049 | Client2@tpg.com.au | 2FR394303L7777920 | 08/07/2013 | 08/07/2013 | 130.00AUD | WEB |
| 4047 | Client4@gmail.com | 45P7474312879332A | 07/07/2013 | 07/07/2013 | 315.00AUD | WEB |
| 4044 | Client7@live.com.au | 3PE527687A4935601 | 06/07/2013 | 06/07/2013 | 669.00AUD | WEB |
| 4042 | Consumer23@gmail.com | 33F97045XE1431011 | 06/07/2013 | 06/07/2013 | 59.00AUD | WEB |
| 251298533477-1261021948015 | BUYER 1 | 92B60923E2279831X | 07/07/2013 | 07/07/2013 | 59.0 | EBAY |
| 251300791173-1260973766015 | BUYER 2 | 1WP225943E1522606 | 07/07/2013 | 07/07/2013 | 292.0 | EBAY |
| 251297956663-1260022787015 | BUYER 3 | 9RB03749RG445022w | 05/07/2013 | 05/07/2013 | 110.0 | EBAY |

FIG. 13C

| SALES ORDER DATA COLLECTION AND MANAGEMENT APPLICATION | | | WELCOME: ADMIN SETTINGS SIGN OUT | | |
|---|---|---|---|---|---|
| 🏠 HOME | | | CONSUMER NAME ▼ | | |
| PAYPAL ECHEQUE PAYMENT LIST | | | | | |
| ORDER REFERENCE | CONSUMER NAME | ORDER DATE | PAYMENT DATE | TRANSACTION ID | ORDER TOTAL | ORDER TYPE |
| 9 | CONSUMER 7 | 08/07/2013 | 08/07/2013 | 0987654 | AUD$0.0 | MANUAL ORDER |
| 7 | CONSUMER 9 | 08/07/2013 | 08/07/2013 | 987654 | AUD$158.13 | MANUAL ORDER |

FIG. 13D

| ⌂ HOME | NEW MANUAL ORDER | | | | | | | | |
|---|---|---|---|---|---|---|---|---|---|
| CASH PAYMENT | | | | | | | | | |
| ORDER REFERENCE | FIRST NAME | LAST NAME | PAID | ORDER DATE | PAYMENT DATE | EMAIL | TOTAL | PAYMENT MODE | INVOICE ID |
| 14 | CONSUMER 24 | | ✓ | 08/07/2013 | 08/07/2013 | Consumer24@hotmail.com | 1,360.94 | CASH | 4 |
| 13 | CONSUMER 25 | | ✓ | 08/07/2013 | 08/07/2013 | Consumer25@gmail.com.au | 1,878.66 | CASH | 3 |

FIG. 13E

SALES ORDER DATA COLLECTION AND MANAGEMENT APPLICATION　　　　WELCOME: ADMIN　SETTINGS　SIGN OUT

🏠 HOME

EBAY ORDER LIST

| ORDER ID | BUYER | TOTAL | PAID | ADDITIONAL PAYMENT | ADDRESS VERIFIED | PARTS CONFIRMED | STATUS | ORDER TYPE |
|---|---|---|---|---|---|---|---|---|
| 251253252772-12121911121015 | BUYER 13 | 235.0 | X | ✓ | X | ✓ | PENDING | EBAY |
| 400373671616-0 | BUYER 14 | 277.0 | X | ✓ | X | X | PENDING | EBAY |
| 400390597083-0 | BUYER 15 | 150.0 | ✓ | ✓ | X | X | PENDING | EBAY |
| 251211313174-0 | BUYER 16 | 150.0 | ✓ | ✓ | X | X | PENDING | EBAY |
| 400387238437-0 | BUYER 17 | 292.0 | ✓ | ✓ | X | X | PENDING | EBAY |

FIG. 14A

🏠 HOME ☐ EBAY ORDER LIST ✓ APPROVE ORDER  DELETE

CONSUMER

XYZ2192
ABC STREET, AUSTRALIA 1234
PHONE: 08 12345678
☒ SUGGEST ADDRESS

PLEASE CLICK ON ABOVE ICON TO
VALIDATE THE ADDRESS

| ORDER # | 4003673671616-0 |
|---|---|
| ORDER DATE | 01/01/2013 |
| AMOUNT | 277.0 |
| PAYMENT METHOD | |
| TRANSACTION ID | |
| PAYMENT STATUS | X |
| ADDITIONAL PAYMENT STATUS | ✓ |
| ADDRESS VERIFIED | X |
| PART CONFIRMED | X |

FIG. 14B

| SALES ORDER DATA COLLECTION AND MANAGEMENT APPLICATION | | WELCOME ADMIN | SETTINGS | SIGN OUT |
|---|---|---|---|---|
| BILLING DETAILS | | | | |
| DAZZA2192 | | ORDER # | | 400373671616-0 |
| 🔍 PLEASE UPDATE YOUR ADDRESS BELOW | | ORDER DATE | | 01/01/2013 |
| BUSINESS NAME | | AMOUNT | | 277.0 |
| ADDRESS1* | XYZ2192 | PAYMENT METHOD | | |
| ADDRESS2* | | TRANSACTION ID | | |
| CITY* | ABC STREET | PAYMENT STATUS | | |
| STATE* | SOUTH AUSTRALIA | ADDITIONAL PAYMENT STATUS | | ✓ |
| COUNTRY* | AUSTRALIA | ADDRESS VERIFIED | | |
| POSTAL CODE | 1234 | PART CONFIRMED | | X |
| PHONE | 0011223344 | | | |
| EMAIL* | | | | |

FIG. 14C

Q PLEASE SELECT PART NUMBER FROM BELOW DROP DOWN. PRESS CLICK CONFIRM ONCE DONE.

| PART # | DESCRIPTION | QUANTITY | TOTAL COST |
|---|---|---|---|
| | SELECT THE PART FROM BELOW LIST | ▶ 1 | 255.0 |
| | SHIPPING COST | | 22.0 |
| | TOTAL | | 277.0 |

SAVE

FIG. 14D

| 251211313 174-0 | CONSUMER 29 | 150.0 | ✓ | ✓ | ✓ | ✓ | PENDING | EBAY |
|---|---|---|---|---|---|---|---|---|
| 400387238 437-0 | CONSUMER 30 | 292.0 | ✓ | ✓ | ✓ | X | PENDING | EBAY |
| 251214716 366-0 | CONSUMER 31 | 292.0 | ✓ | ✓ | X | X | PENDING | EBAY |

FIG. 14E

EDIT SETTINGS

EMAIL SETTINGS

| | |
|---|---|
| HOST* | POP.GMAIL.COM |
| PORT* | 995 |
| USERNAME* | ABC.SUP.APP@GMAIL.COM |
| PASSWORD* | ●●●●●●●●●● |
| USE SSL | ✓ |

TIMEOUT SETTINGS

| | |
|---|---|
| SLEEP TIME* | 600000 |
| TIME OUT* | 600000 |

STORAGE SETTINGS

| | |
|---|---|
| EMAIL STORE FOLDER* | C:\EMAILS |
| EASE FOLDER(REQ)* | C:\EASEIMPORT |

SERVER SETTINGS

ORDER PROCESSING: ☑

FIG. 15C

MAIL SENDER SETTINGS

MAIL HOST* SMTP.GMAIL.COM
PORT* 465
USERNAME* ABC.SUP.APP@GMAIL.COM
PASSWORD* ●●●●●●●
OVERRIDE PASSWORD ABC.SUP.APP@GMAIL.COM

USERNAME* ABC.SUP.APP@GMAIL.COM
PASSWORD* ●●●●●●●
OVERRIDE PASSWORD ABC.SUP.APP@GMAIL.COM

UPDATE

FIG. 15D

| Consumer 39 | 15/07/2013 | Consumer39@me.com | | SUBURB G | 4879 |
|---|---|---|---|---|---|
| Consumer 40 | 15/07/2013 | Consumer40@hotmail.com | 62446909 | SUBURB H | 7018 |
| Consumer 41 | 15/07/2013 | Consumer41@me.com | | SUBURB I | 4879 |
| Consumer 42 | 15/07/2013 | Consumer42@hotmail.com | 0477158270 | SUBURB J | 5600 |
| Consumer 43 | 15/07/2013 | Consumer43@gmail.com | 0447309842 | SUBURB K | 4703 |
| Consumer 44 | 15/07/2013 | Consumer44@hotmail.com | 0400767887 | SUBURB L | 3808 |
| Consumer 45 | 15/07/2013 | Consumer45@gmail.com | 0833703552 | SUBURB M | 5051 |

FIG. 16C

| HOME | PRINT QUOTE | | CREATE ORDER | CREATE INVOICE |

★★★QUOTATION★★★

ABC ENGINEERING GROUP

ABC COURT
XYZ STREET
PHONE: (03) 1122 3344
EMAIL: sales@abcengineering.com.au
A.C.N 123 456 789

MR. ABC
MNO STREET
PHONE: 0123456789
EMAIL: abc@hotmail.com

DATE: 08/07/2013
ACCOUNT: CS
NO: 3

FIG. 17

CREATE MANUAL ORDER

ORDER DETAILS

| FULL NAME* | MR ABC | COMPANY NAME | |
| ACCOUNT* | CS ▶ | ORDER DATE | 07/08/2013 |
| EMAIL* | abc@hotmail.com | PHONE | 0449257022 |

BUYER ADDRESS

| BUYER STREET | XYZ DRIVE | BUYER SUBURB | SUBURB 1 |
| BUYER POST CODE* | 6026 | BUYER STATE | WA |
| BUYER COUNTRY* | ☐ AUSTRALIA ▶ | | |

DELIVERY ADDRESS

PLEASE CLICK ON ICON TO VALIDATE THE ADDRESS

| SAME AS ABOVE | ☐ ☒ SUGGEST ADDRESS | | |
| DELIVERY STREET | XYZ DRIVE | DELIVERY SUBURB | SUBURB 1 |
| DELIVERY POST CODE | 6026 | DELIVERY STATE | WA |
| DELIVERY COUNTRY | ☐ AUSTRALIA ▶ | | |

FIG. 18B

| WEIGHT (KG) | 11.00 |
|---|---|
| POSTAGE COST | ●STANDARD ○EXPRESS |
| | 15.33 |
| TOTAL | 1126.33 |

FIG. 19B

| WEIGHT (KG) | 11.00 |
|---|---|
| POSTAGE COST | ○ STANDARD ●EXPRESS |
| | 54.08 |
| TOTAL | 1165.08 |

FIG. 19C

CREATE MANUAL ORDER

ORDER DETAILS

| FULL NAME:* | MR. ABC XYZ | COMPANY NAME | PQR Inc. |
| ACCOUNT* | CS ▶ | ORDER DATE | 07/08/2013 |
| EMAIL* | abc@hotmail.com | PHONE | 0011223344 |

BUYER ADDRESS

| BUYER STREET | XYZ DRIVE | BUYER SUBURB | SUBURB 1 |
| BUYER POST CODE* | 6026 | BUYER STATE | WA |
| BUYER COUNTRY* | ☐ AUSTRALIA ▶ | | |

DELIVERY ADDRESS

☐ SAME AS ABOVE    ☒ SUGGEST ADDRESS    PLEASE CLICK ON ICON TO VALIDATE THE ADDRESS

| DELIVERY STREET | XYZ DRIVE | DELIVERY SUBURB | SUBURB 1 |
| DELIVERY POST CODE | 6026 | DELIVERY STATE | WA |
| DELIVERY COUNTRY | ☐ AUSTRALIA ▶ | | |

FIG. 20B

ITEMS

| NUMBER | AA601 | DESC | A2A L67 COOLER PLATE ASSEMBLY | QTY | 1 | PRICE | 1100 | WEIGHT (KG) | 11 |
|---|---|---|---|---|---|---|---|---|---|
| | | | | TOTAL WT(KG) | 11.00 | TOTAL | 1100.00 | | |

| NUMBER | MI601 | DESC | COMMODORE VS-VT V6 12MM | QTY | 1 | PRICE | 150 | WEIGHT (KG) | 1.00 |
|---|---|---|---|---|---|---|---|---|---|
| | | | | TOTAL WT(KG) | 1.00 | TOTAL | 150.00 | | |

WEIGHT (KG) [ 12.00 ]

POSTAGE COST ●STANDARD ○EXPRESS [ 28.94 ]

TOTAL [ 1278.94 ]

PAYMENT DETAILS

PAID ○  UNPAID ●

[ RESET SALES ORDER DATA ]   [ CREATE SALES ORDER ]

| ORDER # | 4044 |
|---|---|
| ORDER DATE | 06/07/2013 |
| AMOUNT | $669.00 |
| PAYMENT METHOD | PAYPAL DIRECT |
| TRANSACTION ID | 3PE527687A4935601 |
| PAYMENT STATUS | ✓ |
| PAY APPROVAL COMMENT | |
| ADDRESS VERIFIED | X |

BILLING DETAILS

MR. RST
XYZ STREET
AUSTRALIA VICTORIA 3018
EMAIL: rst@hotmail.com

DELIVERY DETAILS

MR. RST
XYZ STREET
AUSTRALIA VICTORIA 3018

✉ SUGGEST ADDRESS

PLEASE CLICK ON ICON TO VALIDATE THE ADDRESS

FIG. 21B

```
REQUEST=ORDER
ACCOUNT=WEB
ORDER=
CONSUMER REF=
PICKING SLIP=
BILLING NAME=MR. RST
BILLING ADDRESS-1=92, XYZ STREET
BILLING ADDRESS-2=
BILLING SUBARB=ALTONA, VIC 3018
EMAIL ADDRESS=rst@hotmail.com
DELIVERY CODE=EP-SAT-STD
DELIVERY DESCRIPTION=AUST POST, PARCEL
DELIVERY CHARGE=13.64
DELIVERY NAME=MR. ABC
DELIVERY ADDRESS-1=92, XYZ STREET
DELIVERY ADDRESS-2=
DELIVERY SUBARB=ALTONA, VIC 3018
TYPE=Q
DATA REQ=09/07/2013
TRANSACTION COMMENT=
PART NO=BPROC601
QTY=1
PRICE=20.91
```

FIG. 22

SALES ORDER DATA COLLECTION AND MANAGEMENT APPLICATION     WELCOME: ADMIN   SETTINGS   SIGN OUT

[CONSUMER NAME ▶]

🏠 HOME    MANUAL ORDER LIST

CREATE MANUAL ORDER

ORDER DETAILS

FULL NAME*    [MR. LMN]      COMPANY NAME [ ]

ACCOUNT*    [CS ▶]      ORDER DATE [07/08/2013]

EMAIL*    [lmn@gmail.com]      PHONE [0011223344]

BUYER ADDRESS

BUYER STREET    [283, XYZ ROAD]      BUYER SUBURB [SUBURB 3]

BUYER POST CODE*    [4702]      BUYER STATE [QUEENSLAND]

BUYER COUNTRY*    [☐ AUSTRALIA ▶]

FIG. 23B

| WEIGHT (KG) | 1.00 |
|---|---|
| POSTAGE COST | ●STANDARD  ○EXPRESS  12.54 |
| TOTAL | 1112.54 |ин
| | UPDATE |

| PAYMENT DETAILS |
|---|
| PAID  ○ UNPAID  ● |

FIG. 23D

SALES ORDER DATA COLLECTION AND MANAGEMENT SYSTEM

CROSS REFERENCE TO RELATED APPLICATIONS

This application claims priority to and the benefit of provisional patent application number 2013903525 titled "Sales Order Data Collection And Management System", filed in the Australian Patent Office on Sep. 13, 2013. The specification of the above referenced patent application is incorporated herein by reference in its entirety.

BACKGROUND

Over two decades ago, many retail businesses operated in conventional brick and mortar outlets. Sales orders were typically accounted for by manual entries into account books, or by manual entries into accounting software applications which were a developing trend at the time. The retail sector has moved into electronic commerce (e-commerce) rapidly over the years in order to survive and sustain market competition. Retailers are required to closely and systematically manage their transactions and inventory, which requires entry of sales orders against stock, on a day to day basis, into a resource management platform, for example, an enterprise resource planning (ERP) system.

The retailers that operate in both conventional and e-commerce stores are typically required to register transaction entries into the ERP system on a day to day basis. This day to day basis transaction entry process is complicated due to the diversity of transaction sources and natures. Conventionally, transaction entry activities are executed manually, thereby forcing businesses into paying a substantial amount of labour expenses to maintain frequent transaction entries. Although purchased products vary from order to order, the process of recording and processing sales orders is repetitive. For most retailers involved in online selling, a common process includes retrieving the sales orders from sales electronic mails (emails), retrieving consumer details and purchased products information for the sales orders, entering the retrieved consumer details and purchased products information into the ERP system, and processing the sales orders in the ERP system to produce invoices. There is a need to automate these repetitive steps to save time and money spent on manual labour.

Due to differences in the operational nature and form of businesses, a complete customized system that integrates any shopping cart database with an inventory tracking database and with an accounting database is improbable. This improbability rises due to the fact that businesses can operate multiple e-commerce stores and sell different categories of products, or that a business cannot output a complete product at a point of sale owing to a variety of product combinations. Some resource management platform packages, for example, Just Ship IT, etc., allow customized solutions, for example, electronic mail (email) parsing, managing over the counter sales orders, validating addresses, preparing files for importing sales orders into accounting software applications such as QuickBooks® of Intuit, Inc., MYOB® of MYOB US, Inc., etc., parsing sales orders related with web based shopping carts such as eBay® of eBay, Inc., etc. However, such customizations are limited to specific properties of a specific operational inventory system. Furthermore, conventional ERP packages require human intervention at the point of data generation to minimize human errors on collected data, for example, consumer entered data containing discrepancies such as incorrect addresses, incorrectly chosen products, incorrectly perceived suitability of products, etc.

In order to utilize the available resource management platform packages, a complete migration to accounting systems that provide built-in customized solutions as part of the accounting systems is required. Migrating to another accounting system that has a built-in function of automatically importing sales orders requires migration of an online sales engine and creation of an entirely new website to suit the new online sales engine, which are difficult and require a lot of effort.

Hence, there is a long felt but unresolved need for a user friendly, automated, comprehensive, and scalable computer implemented method and system that collects, records, and manages sales order data of multiple sales transactions from multiple different sources in an effective manner with minimal human intervention. Moreover, there is a need for a computer implemented method and system that automates the process of obtaining and importing sales order data from sales orders into a resource management platform, for example, an enterprise resource planning (ERP) system. Furthermore, there is a need for a computer implemented method and system that interfaces data between sales orders in an electronic communication format, provides an application user interface implemented in a cloud computing environment, and prepares an output data format required for importation into the resource management platform.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The automated, comprehensive, and scalable computer implemented method and sales order data collection and management system (SODCMS) disclosed herein address the above stated needs for collecting, recording, and managing sales order data of multiple sales transactions from multiple different sources in an effective and user friendly manner with minimal human intervention. The SODCMS disclosed herein automates the process of obtaining and entering or importing sales order data from sales orders into a resource management platform, for example, an enterprise resource planning (ERP) system. In an embodiment, the resource management platform is an internal resource management platform developed and managed by the SODCMS. In another embodiment, the resource management platform is an external resource management platform accessible to the SODCMS via a network. The computer implemented method and SODCMS disclosed herein interfaces data between sales orders in an electronic communication format, for example, an electronic mail (email) format, provides an application user interface implemented in a cloud computing environment, and prepares an output data format required for importation into the resource management platform. In an embodiment, the computer implemented method and the SODCMS disclosed herein interfaces data between a business' electronic commerce (e-commerce) application programming interface (API), for example, the eBay® API of eBay, Inc., and an eBay® sales order receipt in an email account for extracting eBay® sales orders.

The computer implemented method disclosed herein employs the sales order data collection and management system (SODCMS) comprising at least one processor configured to execute computer program instructions for collecting and managing sales order data from one or more of multiple sources. The sales order data comprises data, for example, from a web based sales order, and/or a manual sales order, and/or a sales order over a communication device, and/or a third party consumer to consumer web based sales order, etc. The sources of the sales order data comprise, for example, electronic communication sources such as electronic mails generated by web based sales orders or online sales orders, electronic commerce sources such as web based sales orders from third party consumer to consumer web based online shopping websites such as eBay® of eBay, Inc., manually documented commerce sources such as over the counter sales orders from manually entered web forms. The SODCMS precludes the need for a sales managing entity, for example, an administrator to manually enter sales order data of sales orders generated from online sales into an accounting software application.

The sales order data collection and management system (SODCMS) receives the sales order data from multiple sources. The SODCMS categorizes the received sales order data based on a type of each source. The SODCMS then parses the categorized sales order data based on filtering criteria associated with each of the sources. The filtering criteria comprise, for example, types of sources, formats of the sales order data, etc. The SODCMS stores the parsed sales order data in one or more databases associated with each of the sources. The SODCMS validates the stored sales order data against validation criteria associated with each of the sources. The validation criteria comprise verification rules, for example, for a product part number validation, for an address verification, for a payment confirmation, etc. The SODCMS processes the validated sales order data for transmission to the resource management platform. In an embodiment, the SODCMS generates a request file associated with the validated sales order data. The SODCMS transmits the generated request file to the resource management platform.

The sales order data collection and management system (SODCMS) saves time required for manually logging into an email account and locating emails that contain sales order data. Furthermore, the SODCMS saves time required for manually obtaining sales order data from a number of sales orders emails that are of the same format. The SODCMS also saves time required for manually identifying and matching payment information of sales orders from email accounts and consolidates different types of sources of retailing, for example, conventional over the counter sales, online store sales, eBay® store sales, etc.

In one or more various aspects, related systems include but are not limited to circuitry and/or programming for effecting the methods referenced herein; the circuitry and/or programming can be virtually any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing carries over to the description of that method step or structure shown by that same numeral in any subsequent drawing herein.

FIGS. 7A-7C exemplarily illustrate screenshots of a graphical user interface provided by the sales order data collection and management system, showing menu lists and a sales order records section.

FIGS. 9A-9D exemplarily illustrate screenshots of a graphical user interface provided by the sales order data collection and management system for collecting and managing sales order data from web based sales orders.

FIGS. 10A-10D exemplarily illustrate screenshots of a graphical user interface provided by the sales order data collection and management system for collecting and managing sales order data from an online shopping website.

FIGS. 11A-11F exemplarily illustrate screenshots of a graphical user interface provided by the sales order data collection and management system for collecting and managing manually entered sales order data.

FIGS. 12A-12D exemplarily illustrate screenshots of a graphical user interface provided by the sales order data collection and management system for creating and managing sales quotes.

FIGS. 13A-13F exemplarily illustrate screenshots of a graphical user interface provided by the sales order data collection and management system for viewing payments associated with sales orders in multiple modes.

FIGS. 14A-14E exemplarily illustrate screenshots of a graphical user interface provided by the sales order data collection and management system for manually approving pending sales orders.

FIGS. 15A-15D exemplarily illustrate screenshots of a graphical user interface provided by the sales order data collection and management system for editing configuration settings of the sales order data collection and management system.

FIGS. 16A-16C exemplarily illustrate screenshots of a graphical user interface provided by the sales order data collection and management system, showing search options for searching sales order data based on content.

FIG. 17 exemplarily illustrates a screenshot of a graphical user interface provided by the sales order data collection and management system for printing sales order data.

FIGS. 18A-18B exemplarily illustrate screenshots of a graphical user interface provided by the sales order data collection and management system, showing an auto-complete feature provided by the sales order data collection and management system during creation of a manual sales order.

FIGS. 19A-19C exemplarily illustrate screenshots of a graphical user interface provided by the sales order data collection and management system for calculating shipping costs.

Figure 20E:
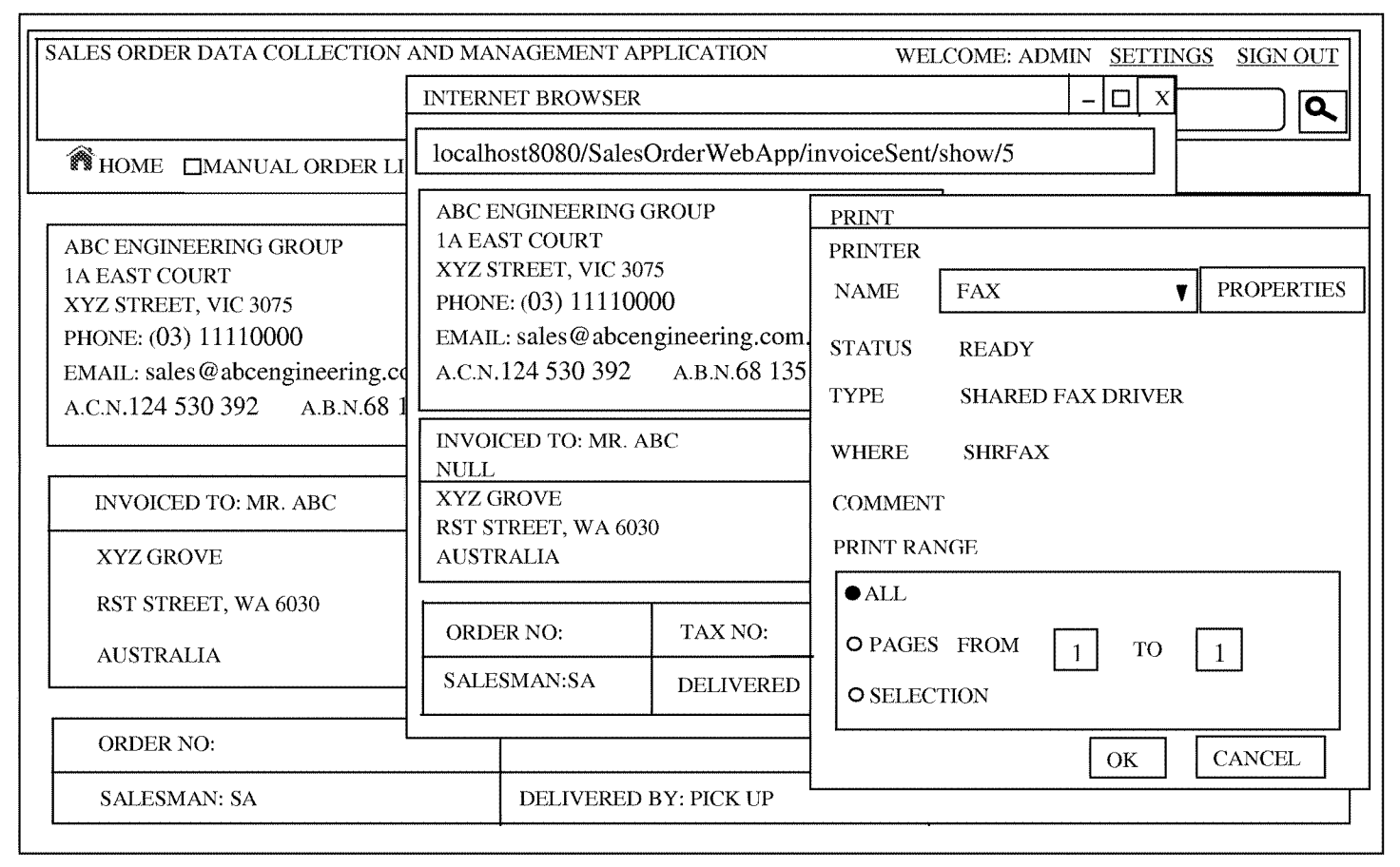

FIGS. 20A-20E exemplarily illustrate screenshots of a graphical user interface provided by the sales order data collection and management system for converting sales quotes into sales orders and sales order invoices.

FIGS. 21A-21D exemplarily illustrate screenshots of a graphical user interface provided by the sales order data collection and management system for validating a delivery address associated with a sales order.

FIG. 22 exemplarily illustrates a sample request file associated with a sales order, generated by the sales order data collection and management system.

FIGS. 23A-23D exemplarily illustrate screenshots of a graphical user interface provided by the sales order data collection and management system for editing manually generated sales orders.

DETAILED DESCRIPTION OF THE INVENTION

Figure 1:
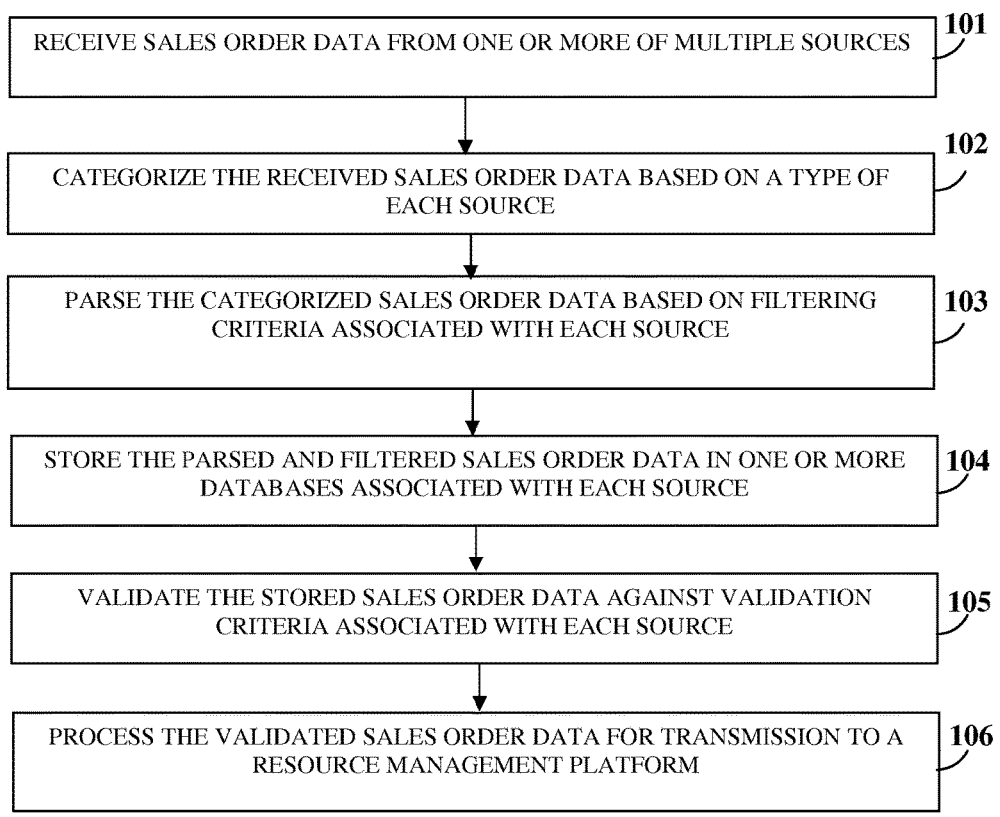
FIG. 1 illustrates a computer implemented method for collecting and managing sales order data from multiple sources.

FIG. 1 illustrates a computer implemented method for collecting and managing sales order data from multiple sources. The computer implemented method disclosed herein employs a sales order data collection and management system (SODCMS) comprising at least one processor configured to execute computer program instructions for collecting and managing sales order data from one or more of multiple sources. As used herein, "sales order data" refers to data associated with a sales order. Also, as used herein, "sales order" refers to an order or an agreement issued by a business to another business and/or a consumer during a sale of one or more products and/or services.

The sales order data collection and management system (SODCMS) receives sales order data automatically or manually through different sources. The sales order data comprises data, for example, from one or more of a web based sales order, a manual sales order, a sales order over a communication device, and/or a third party consumer to consumer web based sales order. The sales order data comprises, for example, addresses, quotes, invoices, spot orders, part numbers, payment options, payment transaction information, sales order statuses, sales contracts, etc. The sources of the sales order data comprise, for example, electronic communication sources such as electronic mails (emails) generated by web based sales orders or online sales orders, electronic commerce sources such as web based sales orders from third party consumer to consumer web based online shopping websites such as eBay® of eBay, Inc., and manually documented commerce sources such as over the counter sales orders from manually entered web forms. For purposes of illustration, the detailed description refers to eBay® as one of the consumer web based online shopping websites; however the scope of the computer implemented method and system disclosed herein is not limited to eBay® being the consumer web based online shopping website, but may be extended to include other consumer web based online shopping websites.

In an embodiment, the sales order data collection and management system (SODCMS) is implemented in a cloud computing environment. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of configurable computing physical and logical resources. The SODCMS is a cloud computing based application implemented as a service for collecting and managing sales order data from multiple sources. The SODCMS is developed, for example, using the Amazon Elastic Compute Cloud (Amazon EC2®) infrastructure of Amazon Technologies, Inc.

The sales order data collection and management system (SODCMS) disclosed herein comprises an order management application, herein referred to as a "sales order data collection and management application" configured to implement the steps of the computer implemented method disclosed herein. In an embodiment, the sales order data collection and management application (SODCMA) is configured as a software application downloadable and executable on a communication device. In another embodiment, the SODCMA is implemented as a website or a web based platform or a web browser based platform hosted on a server or a network of servers to provide ease of access. In another embodiment, the SODCMA is implemented as a desktop application downloadable onto a communication device, for example, a personal computer, a laptop, a tablet computer, a mobile phone, a personal digital assistant, etc.

The sales order data collection and management system (SODCMS) disclosed herein comprises the sales order data collection and management application (SODCMA) implemented with an inventory system comprising one or more databases, a resource management platform, an internal and/or external resource management database, a deployment of a post office protocol (POP) version 3 (POP3) electronic mail (email) account, a cloud based email parser and filter, a listing system, a detailed spreadsheet record, a report generation module, and graphical user interfaces (GUIs) accessible by a sales managing entity and configured, for example, for displaying total statistics and statuses of parsed sales orders, presenting logged information of the parsed sales orders in comprehensive categories, etc. As used herein, "sales managing entity" refers to an entity, for example, a business analyst, a sales manager, a sales administrator, a sales organization, etc., responsible for the management of collection and processing of sales order data from multiple sources performed by the SODCMS. The inventory system comprises multiple assemblies and multiple levels of subassemblies. Each stock keeping unit (SKU) in the inventory system is assigned a part number or an SKU code. A majority of final assemblies are packed at a point of sale.

In an embodiment, the resource management platform is an internal resource management platform developed and managed by the sales order data collection and management system (SODCMS). In another embodiment, the resource management platform is an external resource management platform accessible to the SODCMS via a network. The resource management platform, for example, an enterprise resource planning (ERP) system records financial operational data on a day-to-day basis along with inventory data updates resulting from selling and purchasing activities. The internal and/or external resource management database, for example, an operational ERP system database imports a transfer path along with a specified data format for sales order importation. As used herein, "transfer path" refers to a path for exchange of data between a source location and a destination location. The transfer path provides predefined conditions and instructions for importation of sales order data to the external and/or the internal resource management platform. The transfer path comprises, for example, instructions for a format of sales order data, a storage destination for sales order data in a database of the internal external resource management platform and/or the external resource management platform, and/or databases of the SODCMS, etc.

A deployment of the POP3 email account is configurable by a sales managing entity such as an administrator. Receipts of sales orders from business web based stores, for example, an online shopping store such as the eBay® store of eBay, Inc., are generated in an email format. In the same POP3 email account, subsequent electronic payment receipts of business sales orders are generated in an email format. The cloud based email parser and filter with parsing and filtering rules predetermined by output aspects driven by the databases of the SODCMS and/or external resource management databases, import a transfer path specified format. The email parser and filter is additionally driven by user need.

The sales order data collection and management system (SODCMS) also integrates an application programming interface (API), for example, the eBay® API for directly obtaining eBay® sales order data. Moreover, for sales via third party consumer to consumer web based businesses such as the eBay® store, the product category is not in the categories that support multiple product listing. The eBay® advertisements for such products allow for product variance and pricing variation of these products. The listing system, for example, the eBay® listing system contains multiple variations with a fixed price or a not-fixed price. The SODCMS allows a consumer to select a part from the variations and adjust pricing and payments accordingly. The detailed spreadsheet record of the variations comprises a list of multiple variations of products and parts. The spreadsheet record is created manually or automatically. The SODCMS parses the sales order data contained in the spreadsheet record automatically. In an embodiment, the SODCMS generates and communicates an analytics report associated with the sales order data to a sales managing entity via the GUI. The analytics report reports statistics and statuses from the sales order data. The report generation module generates and displays analytics reports of total statistics and statuses of the parsed sales orders, and presents logged information of the parsed sales orders in comprehensive categories via the GUIs.

In the computer implemented method disclosed herein, the sales order data collection and management system (SODCMS) receives 101 sales order data from multiple sources, for example, from emails generated by web based sales orders, application programming interfaces (APIs) such as the eBay® API, manual entries, etc. In an embodiment, the SODCMS defines configurable time intervals for receiving one or more of the sales order data, for example, of web based sales orders from one or more of the sources. The SODCMS periodically accesses a web server via a network, for example, the internet, at the defined configurable time intervals for receiving the sales order data, for example, of web based sales orders, third party consumer to consumer web based sales orders, etc. In another embodiment, the SODCMS allows a sales managing entity to manually access the web server via the network at periodic time intervals via the graphical user interface (GUI) provided by the SODCMS for accessing the sales order data from the sources. Examples of the network through which the sales order data collection and management system (SODCMS) accesses the web server are disclosed in the detailed description of FIG. 4. The SODCMS requests for sales order data at periodic configurable intervals. For web based sales orders, the SODCMS receives the sales order data through the web server, for example, an email server, and for eBay® sales orders, the SODCMS receives the sales order data through the eBay® API using an extensible markup language (XML) format. In an embodiment, the SODCMS receives sales order data via shopping cart APIs. For manual sales orders, the SODCMS receives the sales order data directly from a web form configured for manual entry of sales order data as exemplarily illustrated in FIG. 11E.

The sales order data collection and management system (SODCMS) autonomously operates continuously until execution is terminated. In an embodiment, a sales managing entity can terminate and resume the autonomous and continuous runtime of the SODCMS. The SODCMS idles for a predefined configurable time interval, herein referred to as "an idle time period". The SODCMS wakes up to connect to the web server at predefined configurable time intervals via a secured network connection, for example, the post office protocol version 3 (POP3). For example, if any new emails are available, the SODCMS downloads the new emails; else the SODCMS returns to an idle mode for another time interval before checking for new emails by connecting to the web server. The idle time period is predefined by the SODCMS and is user configurable. The SODCMS updates the generation of new sales orders during the idle time period without imposing any process delay.

The sales order data collection and management system (SODCMS) categorizes 102 the received sales order data based on a type of each source. The different types of sources comprise, for example, entities such as businesses catering to conventional over the counter sales, web based sales, sales over communication devices, third party consumer to consumer web based businesses such as eBay®, etc. For example, on receiving a new email, the SODCMS scans a header and a subject title of each new email to categorize the email as per the type of source from where the email is received. The SODCMS parses 103 the categorized sales order data based on filtering criteria associated with each of the sources. As used herein, "filtering criteria" refers to a set of parsing and filtering rules associated with each of the sources for parsing and filtering the sales order data from each of the sources. In an embodiment, the parsing and filtering rules are configured by an authorized sales managing entity, for example, an administrator of the SODCMS. The parsing and filtering rules are determined, for example, based on shopping cart sales order email formats or other application programming interface (API) requests. The filtering criteria associated with each of the sources comprise, for example, types of the sources, formats of the sales order data, etc. In an embodiment, the SODCMS implements an automatic filter functionality to collect the correct sales order data. The SODCMS parses, for example, sales order data retrieved directly from a website, sales order data from emails generated by web based sales orders, sales order data from online shopping websites such as eBay® by deploying APIs, for example, the eBay® API, etc., and/or over the counter sales order data manually entered into a web form format. In an embodiment, the SODCMS parses the sales order data retrieved directly from a website into accounting packages such as the EASE business computing system. Consider an example where the source comprises emails. The emails are generated by different sales orders. These emails contain variations in information content. The filtering rules that need to be applied for parsing of the sales order data from such emails vary based on the categories of the received emails. The SODCMS categorizes and parses sales order data from positively identified emails as per the filtering rules depending on their categories.

The sales order data collection and management system (SODCMS) parses the categorized sales order data from multiple sources into a specific format and file extension for importing the sales order data into a resource management platform, for example, an enterprise resource planning (ERP) system. In an embodiment, the SODCMS extracts frequent or popular queries from the received sales order data, automatically executes the extracted frequent queries, and processes responses to the executed frequent queries. The SODCMS records and stores the extracted frequent queries and the processed responses to the frequent queries in one or more databases for efficiently managing the sales order data by minimizing the processing time.

The sales order data collection and management system (SODCMS) stores 104 or records the parsed and filtered sales order data in one or more databases associated with each of the sources. In an embodiment, the SODCMS stores the parsed and filtered sales order data in the databases of the SODCMS. In another embodiment, the SODCMS stores the parsed and filtered sales order data in external databases on web servers. In an embodiment, the SODCMS stores the parsed and filtered sales order data in virtual databases stored in a web services server based on the type of each source. The databases comprise, for example, a structured query language (SQL) data store or a not only SQL (NoSQL) data store such as the Microsoft® SQL Server®, the Oracle® servers, the MySQL® database of MySQL AB Company, the mongoDB® of 10gen, Inc., etc. In an embodiment, the databases can also be locations in a file system. The databases refer to any storage area or medium that can be used for storing data and files. In another embodiment, the databases can be remotely accessed by the SODCMS via a network. In another embodiment, the database is configured as a cloud based database implemented in a cloud computing environment, where computing resources are delivered as a service over a network, for example, the internet. In another embodiment, the SODCMS stores the parsed sales order data into an intermediate non-modifiable database that is accessible only to an authorized sales managing entity. The database is directly accessible and modifiable by an authorized sales managing entity that has accessing details and authorisation to the intermediate non-modifiable database. Consumers do not have the authority to access or modify the intermediate non-modifiable database. The intermediate non-modifiable database has a parameter map similar to a structured query language (SQL) database.

The sales order data collection and management system (SODCMS) validates 105 the stored sales order data against validation criteria associated with each of the sources. As used herein, "validation criteria" refers to a set of verification rules applied to the stored sales order data to validate authenticity of the stored sales order data. The validation criteria comprise verification rules, for example, for product part number validation, for an address verification, for a payment confirmation, etc. In an embodiment, the SODCMS receives a validation of one or more of the stored sales order data against the validation criteria from an external validation platform. For example, the SODCMS verifies addresses extracted from the sales order data, for example, using a Google® Maps application programming interface (API). If the SODCMS locates an existing address in a sales order on the Google® Maps API, the SODCMS considers the address as verified and vice versa. For web based sales orders, the SODCMS runs address verification on the sales order and applies an address verification status for valid addresses. In an embodiment, the SODCMS excludes some address fields, for example, post office boxes from the verification. In an embodiment, the SODCMS generates an email message against a specific sales order's parsed email address requesting reconfirmation of addresses that do not pass the address verification.

In an embodiment, the sales order data collection and management system (SODCMS) renders messages to consumers based on the validation of the stored sales order data. The rendered messages comprise, for example, information on modifications and discrepancies associated with the sales order data. The modifications and discrepancies, for example, differences in payments, address modifications, sub-parts selection, additional information, etc., in the sales order data arise as a result of amendments made to the sales order that is undergoing validation or is already validated. For example, when the address verification process fails, the SODCMS generates a default email and sends the default email to a consumer's email address requesting the consumer to confirm his/her address. The default email comprises, for example, a hyperlink to a corresponding web form using which the consumer can modify the address. In an embodiment, the SODCMS receives a manual validation of one or more of the stored sales order data against the validation criteria from a sales managing entity via a key validation interface provided by the SODCMS. For example, the SODCMS generates a manual enquiry and applies manual address verification, for example, via a hot key on the key validation interface provided by the SODCMS. The SODCMS parses the web form data into an intermediate database associated with the corresponding sales order and marks the sales order as "address validated".

In an embodiment, the sales order data collection and management system (SODCMS) integrates with an external payment gateway for dynamically validating and processing a payment associated with the stored sales order data, received through one or more of multiple payment modes based on a preliminary invoice extracted from the received sales order data or a revised invoice generated by the sales order data collection and management system. The payment modes comprise, for example, an electronic currency mode and a physical currency mode. The electronic currency mode comprises, for example, payment via cryptocurrency such as Bitcoin, a debit card, a credit card, an electronic fund transfer, direct credit, direct debit, internet banking, etc. The physical currency mode comprises, for example, payment via cash, a check, etc. In an example, the SODCMS integrates with PayPal® of PayPal, Inc., for automatically sending out revised invoices and automatically approving payments for the revised invoices. In an embodiment, the SODCMS receives a payment confirmation message from an external payment gateway for validating the stored sales order data against the validation criteria of payment confirmation. For example, the SODCMS receives a payment transaction identifier (ID) generated by PayPal® as a confirmation of payment for a sales order.

In an embodiment, the sales order data collection and management system (SODCMS) maintains a spreadsheet of parts variation of each product extracted from the received sales order data. As used herein, "parts variation" refers to variations in features of a product corresponding to a sales order, resulting in different versions of the same product. The parts variations can result, for example, from pricing variation, structural variations, payment mode variation, etc. In this embodiment, the SODCMS verifies a sales order for a single listing or a listing with parts variation of a product against the maintained spreadsheet of parts variation of each product. If the sales order is for a listing with parts variation, the SODCMS generates a request message against an address associated with the sales order requesting a selection of the product with the parts variation. In an embodiment, the SODCMS generates a revised invoice to account for a price difference due to the selection of the product with the parts variation and transmits the revised invoice to a communication device of a consumer for receiving additional payment through one or more of the payment modes disclosed above from the consumer based on the price difference.

Figure 19A:
Figure 20A:
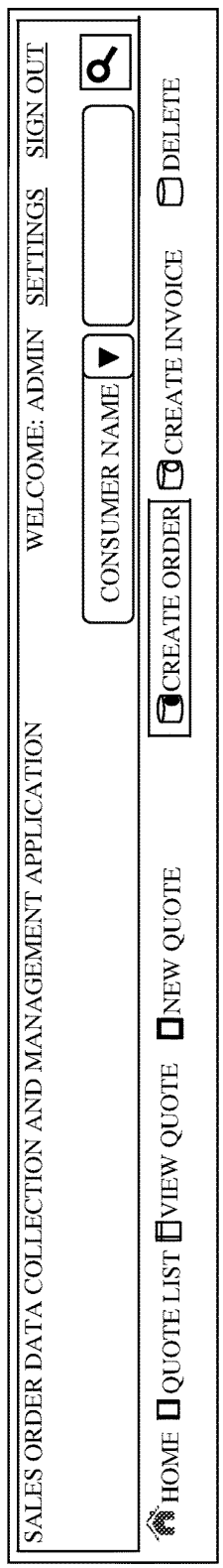
Figure 20D:
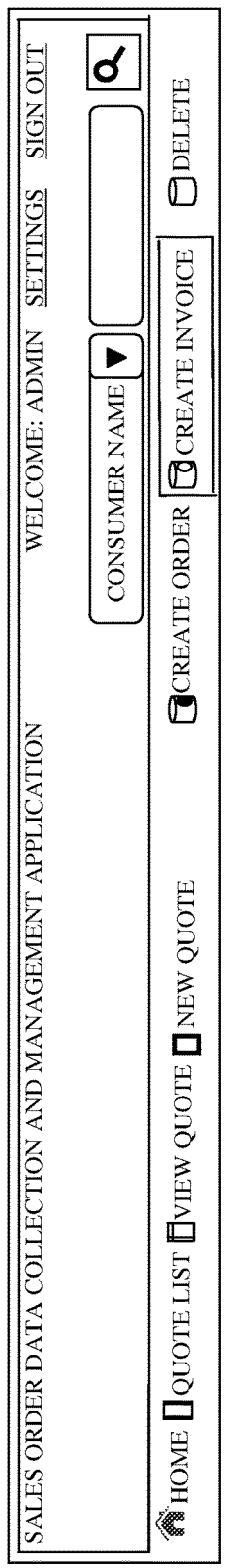
Figure 21C:
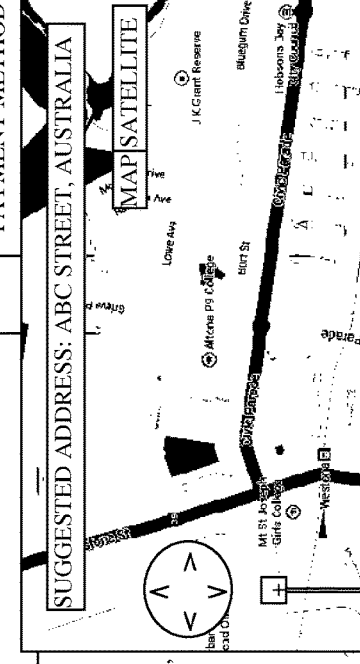
Figure 21D:
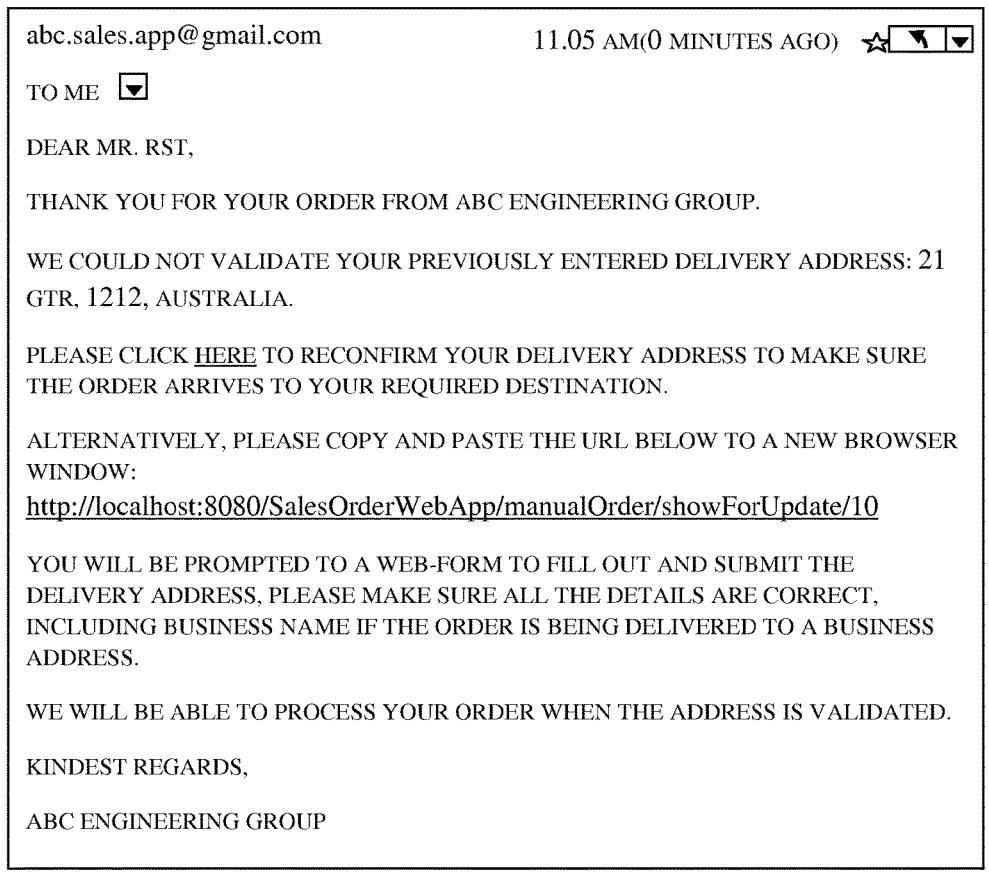
Figure 23A:
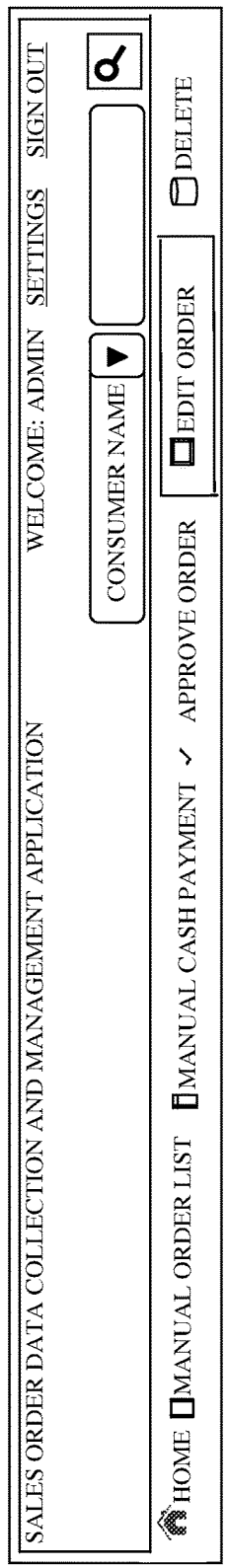
Figure 23C:

In an embodiment, the sales order data collection and management system (SODCMS) calculates a cost from a sales order associated with the validated sales order data for determining a total cost of a product of the sales order as disclosed in the detailed description of FIGS. 19A-19C.

After validation of the stored sales order data, the sales order data collection and management system (SODCMS) processes 106 the validated sales order data for transmission to the internal and/or external resource management platform. In an embodiment, during processing of the validated sales order data, the SODCMS generates a request file associated with the validated sales order data. As used herein, "request file" refers to a file comprising validated and processed sales order data with information required for importation and processing of the validated and processed sales order data in an internal and/or external resource management platform, for example, an enterprise resource planning (ERP) system. The SODCMS generates and stores the request files for processed sales orders and prepares for the importation of the request files into the resource management platform. The SODCMS transmits the generated request file to the resource management platform. The SODCMS records financial operational data on a day-to-day basis including inventory data updates resulting from selling and purchasing activities into the resource management platform. The SODCMS uses a file request-response mechanism to import sales order data into the internal and/or external resource management database. The request file format for importation is, for example, a readable text file containing parameters or sales order data in a format requested for successful processing of sales orders, saved in a specified location or database. The resource management platform automatically retrieves the request files stored in the specified location or database at a set time interval, either internally within itself, or externally through third party applications, for example, Windows® task scheduler of Microsoft Corporation. For successively imported request files, the SODCMS archives the original request files into another specified location or database. The SODCMS also generates a short text file to report the successful importation of the generated request file.

In an embodiment, the sales order data collection and management system (SODCMS) generates requests for processing the received sales order data based on a status extracted from the received sales order data. The status of the sales order is, for example, pending or processed. In an embodiment, the SODCMS tracks a status of a sales order and categorizes the received sales order data based on the status extracted from the received sales order data for processing the sales order. The SODCMS periodically checks for sales orders having a pending status and automatically generates requests for processing of these pending sales orders. In an embodiment, if a sales order is confirmed paid, the SODCMS imports the sales order data of that sales order instantly into the resource management platform, whereas if a sales order is not yet paid, the SODCMS does not disclose the sales order data of that sales order. The SODCMS plans and structures the automatic requests sent via email to communication devices of consumers to automatically update and process sales orders having pending statuses. The SODCMS automatically populates and displays the status of each sales order for ease of search. In an embodiment, the SODCMS can be used for managing sales orders associated with any business activity and can be implemented with online sales engines, for example, ePages® of ePages GmbH and other similar online sales engines, eBay®, and accounting packages such as the EASE business computing system and other accounting packages.

Consider an example where a sales managing entity such as an administrator of the sales order data collection and management system (SODCMS) logs into the SODCMS via a graphical user interface (GUI) of the SODCMS. In an embodiment, the sales managing entity uses the GUI to configure an idle time period of 10 seconds for the SODCMS to connect to an email box on a post office protocol version 3 (POP3) mail server via a network and retrieve new web based sales orders from the email box after every 10 seconds. In another embodiment, the sales managing entity can manually connect to the email box on the POP3 mail server via the network and retrieve new web based sales orders from the email box after every 10 seconds. The SODCMS checks a status of all pending web based sales orders and performs, for example, an address validation and a payment confirmation to validate the web based sales orders data. The SODCMS interfaces with the Google® Maps application programming interface (API) for validating addresses of consumers associated with the web based sales orders. If any address is not found using the Google® Maps API, the SODCMS sends an email notification to consumers associated with the pending web based sales orders. On receiving a confirmation from the consumers, the SODCMS further validates the addresses of the consumers corresponding to the web based sales orders.

The sales order data collection and management system (SODCMS) also checks whether products listed in the web based sales orders have parts variations by using a spreadsheet comprising details of parts variations maintained by the SODCMS. If a particular product of a web based sales order contains parts variations, the SODCMS transmits an email notification to a consumer associated with the web based sales order with the parts variations to receive a selection of a desired part of the product from the consumer. If the selection results in a price difference, the SODCMS generates a revised invoice to account for the price difference and transmits the revised invoice to a consumer's communication device for receiving additional payment through one or more of the payment modes disclosed above from the consumer. The SODCMS verifies the mode of payment for each web based sales order and accordingly processes each web based sales order. After successful processing of payment for each web based sales order, the sales order data collection and management system (SODCMS) receives a payment transaction identifier (ID) generated from a payment authorizing third party and displays the payment transaction ID to the sales managing entity via the GUI. After the web based sales orders are validated and processed, the SODCMS generates a request file for each processed web based sales order and transmits the generated request file to an external or internal enterprise resource planning (ERP) system for storing sales order data associated with each validated and processed web based sales order in a database of the ERP system.

Figure 2A:
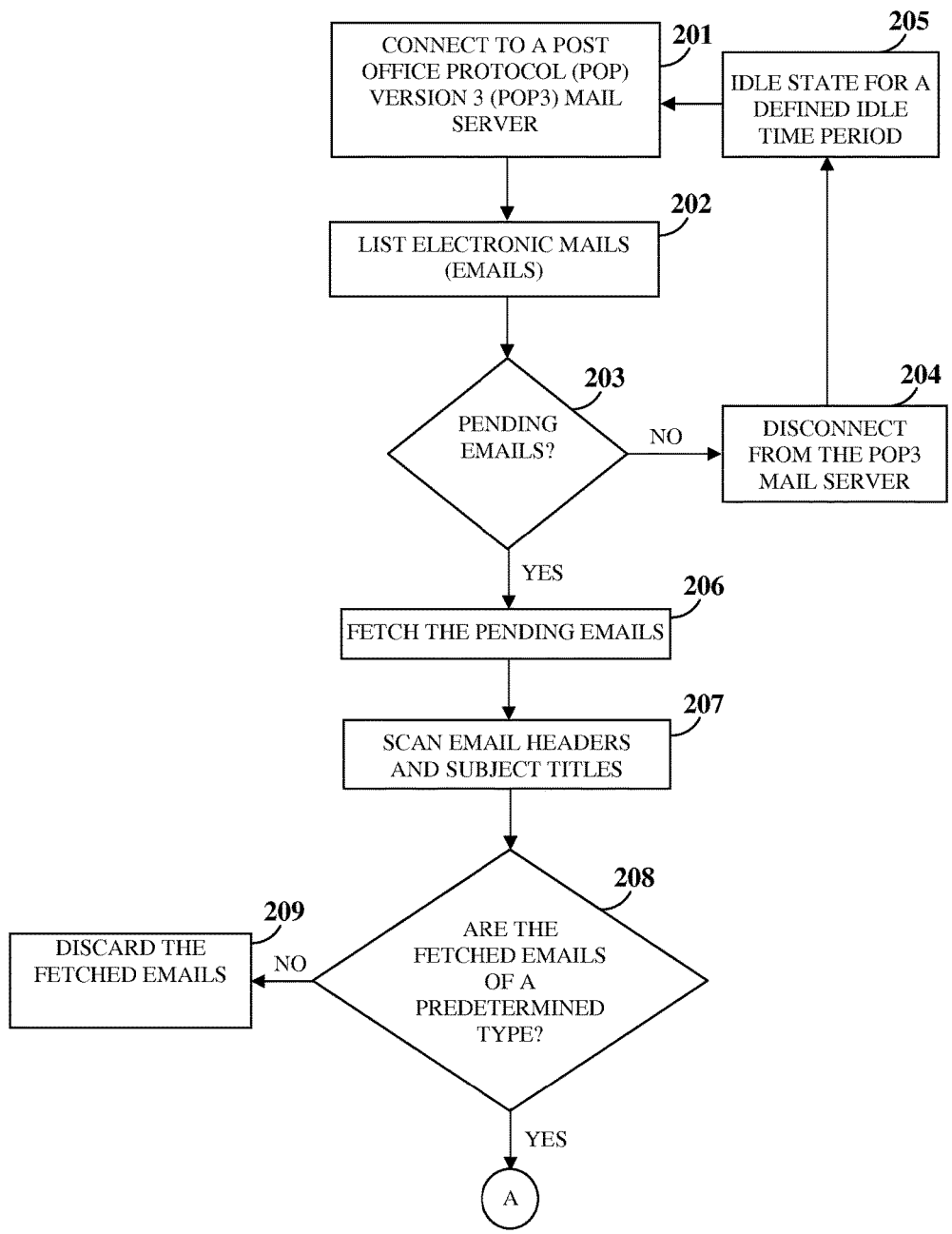
FIGS. 2A-2C exemplarily illustrate a flowchart comprising the steps performed by a sales order data collection and management system for collecting and managing sales order data from multiple sources.
Figure 2B:
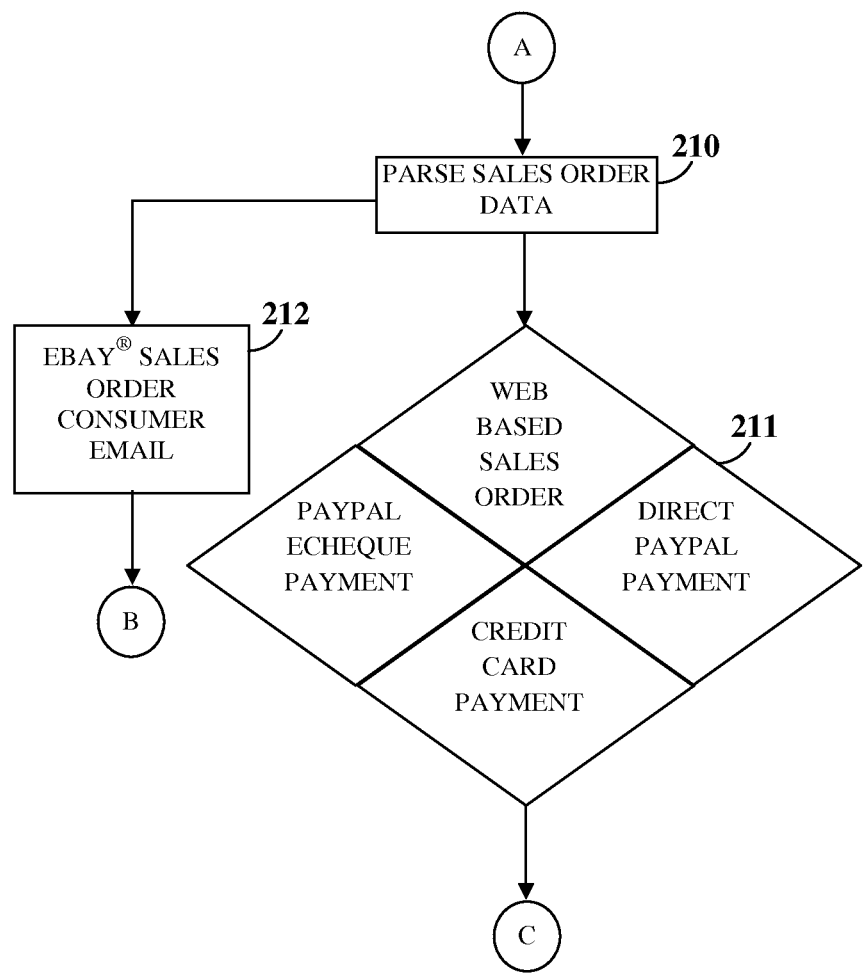
Figure 2C:
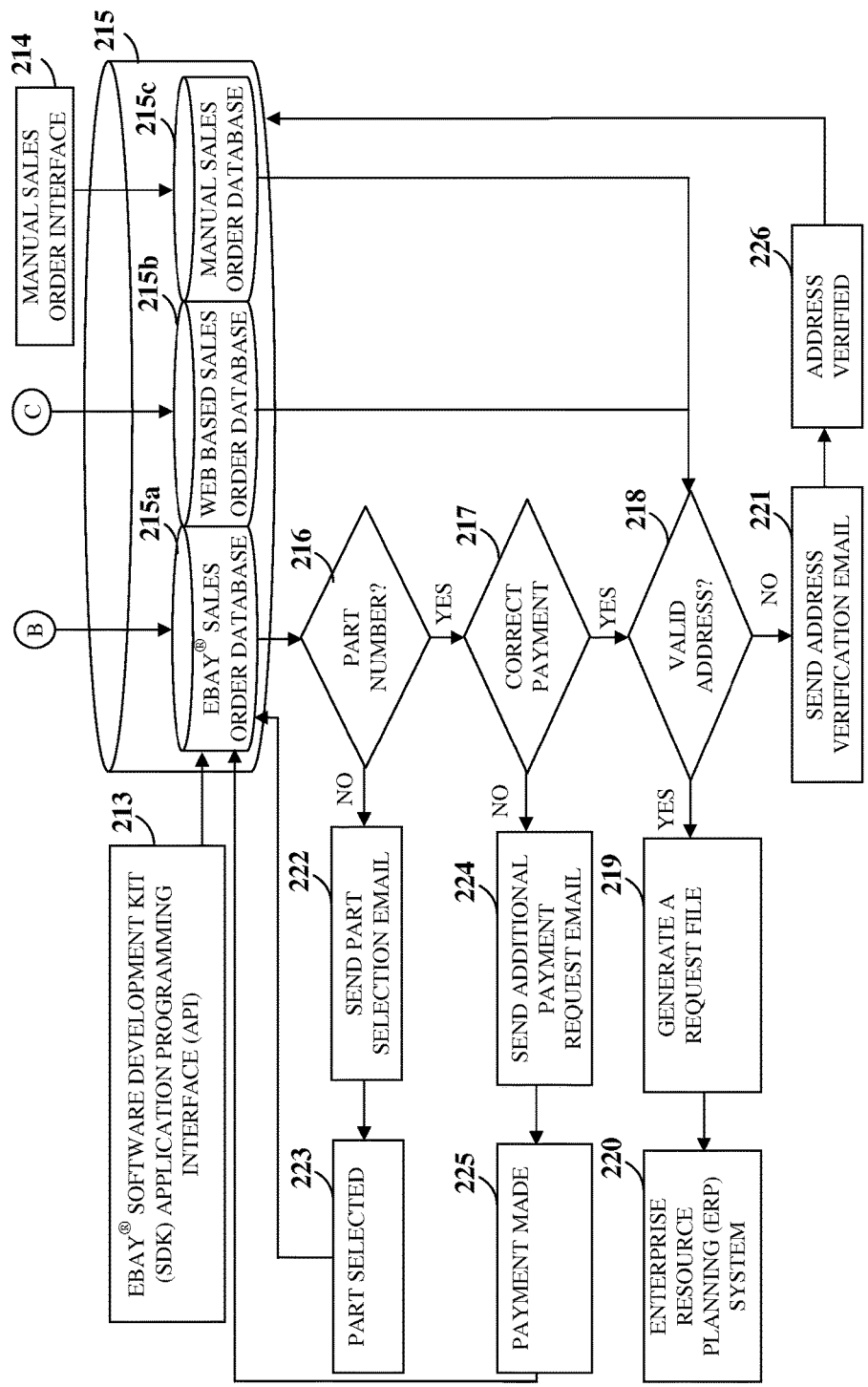

FIGS. 2A-2C exemplarily illustrate a flowchart comprising the steps performed by the sales order data collection and management system (SODCMS) for collecting and managing sales order data from multiple sources. The SODCMS processes different types of sales orders, for example, web based sales orders from electronic mails (emails), web based sales orders from online shopping websites such as eBay®, and sales orders from manually entered web forms. The SODCMS saves time by logging into a web server to access emails and locating the emails containing sales order data from a number of sales order emails that are similar in format. The sales orders are created on an online shopping website and emails are sent to an email box corresponding to the sales orders. As exemplarily illustrated in FIG. 2A, the SODCMS connects 201 to the email box on a post office protocol version 3 (POP3) mail server via a network, for example, at configurable time intervals to retrieve 202 a list of emails for web based sales orders. The SODCMS checks 203 for pending or new emails. If there are no pending emails, the SODCMS disconnects 204 from the POP3 mail server. The SODCMS remains 205 in an idle state for a defined idle time period. After completion of the idle time period, the SODCMS connects 201 to the POP3 mail server again. If pending emails are found, the SODCMS fetches 206 the pending or new emails. The SODCMS then scans 207 email headers and subject titles of the fetched emails. The SODCMS scans subject fields of the fetched emails for checking 208 whether the fetched emails are of a predetermined type. For example, the SODCMS parses the fetched emails and determines whether the fetched emails have a subject such as "Order receipt confirmation of your order". If the fetched emails are not of a predetermined type, the SODCMS discards 209 the fetched emails.

As exemplarily illustrated in FIG. 2B, for an email account containing multiple categories of emails, the sales order data collection and management system (SODCMS) parses 210 only the emails comprising sales order data and displays the parsed sales order data on an application programming interface or a graphical user interface (GUI) provided by the SODCMS, for tracking the sales orders, thereby providing integrity and privacy of information. The GUI provided by the SODCMS is configured as a universal interface for managing pre-accounting-entry sales order data for sales orders from different sources, for example, online sales from sales websites, online sales from eBay® stores, sales over communication devices, over the counter sales, etc., and quoting purposes. In an embodiment, the GUI enables sales managing entities to manually enter over the counter sales order data. The GUI provides a one click importation of sales orders that are confirmed and fulfilled.

The sales order data collection and management system (SODCMS) marks the status of a sales order as "processed" when a delivery address of the sales order is valid and a payment confirmation email is received with any one of the subjects, for example, "Receipt of approved purchase and/or payment", "Notification of an Instant Payment Received from", "Notification of Payment Received", "Notification of a Cleared ECheque Payment", etc. If any of these conditions are not fulfilled, the SODCMS marks the status of the sales order as "pending". The SODCMS categorizes 211 the parsed sales order data, for example, as a web based sales order and also as per the payment type involved, for example, an ECheque payment via an external payment gateway such as PayPal® of PayPal, Inc., a PayPal® Direct payment, a credit card payment, etc. Moreover, the SODCMS determines an eBay® sales order consumer email 212 from the parsed sales order data.

The sales order data collection and management system (SODCMS) stores the parsed and categorized sales order data in intermediate databases 215 comprising, for example, a web based sales order database 215b, an eBay® sales order database 215a, and a manual sales order database 215c associated with each of the categories of the sales order data as exemplarily illustrated in FIG. 2C. In an example, the SODCMS uses an eBay® software development kit (SDK) application programming interface (API) 213 to retrieve sales orders from the eBay® online shopping website. The SODCMS stores the eBay® sales order data received via emails or via the eBay® online shopping website in the eBay® sales order database 215a exemplarily illustrated in FIG. 2C. For over-the-counter sales orders, the sales managing entity enters sales order data into a manual sales order interface 214. The SODCMS receives the manually entered sales order data through the manual sales order interface 214 and stores the manually entered sales order data in the manual sales order database 215c. The manual sales order interface 214 allows the SODCMS to completely collect required information for generating a request file for processing the sales orders.

As exemplarily illustrated in FIG. 2C, the sales order data collection and management system (SODCMS) validates the stored sales order data against validation criteria as disclosed in the detailed description of FIG. 1. For example, the SODCMS validates 216 a part number of the eBay® sales order. A single part has many variants with different part numbers. If a part number is not found, the SODCMS sends 222 a part selection email comprising a hyperlink to the consumer. The consumer clicks on the hyperlink and fills up a web form to indicate 223 the part selected. The SODCMS receives an indication of which variant the consumer has ordered and issues a "part confirmed" status to the sales order in the eBay® sales order database 215a. If the part number is found, the SODCMS further verifies 217 whether a correct payment is received for the sales order. If the correct payment is not made, the SODCMS sends 224 an additional payment request email with a revised invoice to the consumer. The SODCMS verifies whether the payment is made 225 by the consumer. If the correct payment is made, the SODCMS issues a "payment made" status to the sales order in the eBay® sales order database 215a. The SODCMS then performs an address verification 218 for the eBay® sales order.

For web based and manually entered sales orders, the sales order data collection and management system (SODCMS), in communication with the web based sales order database 215b and the manual sales order database 215c, executes address verification 218 on each sales order and applies an address verification status to the sales order, if the address is found to be valid. For a failed address verification, the SODCMS generates a default address verification email and sends 221 the address verification email to the consumer's email address, requesting the consumer to verify his/her address through a web form accessed via a hyperlink in the address verification email. The SODCMS receives the verified address 226 from the filled out web form and directly parses the received address into the intermediate databases 215 corresponding to the sales order. The SODCMS marks the sales order with an "address verified" status.

For address verification requests that are not replied, the sales order data collection and management system (SODCMS) generates a manual enquiry and applies manual address verification, for example, via a hot key on the GUI provided by the SODCMS. Simultaneously, the SODCMS parses subsequent payment emails for required sales order data and applies the parsed sales order data onto the corresponding sales order in the intermediate databases 215. After validation of the address and the payment, the SODCMS generates 219 a corresponding request file containing necessary information for the sales order to be processed through the resource management platform, for example, an enterprise resource planning (ERP) system 220 and saves the request file into a specified location, for example, an external resource management database or the ERP system database. Once the required sales order data is entered and submitted and when the correct payment is applied and the address is validated, the SODCMS approves the sales order for processing in the resource management platform, and applies a "processed" status to the sales order in the intermediate databases 215.

Figure 3A:
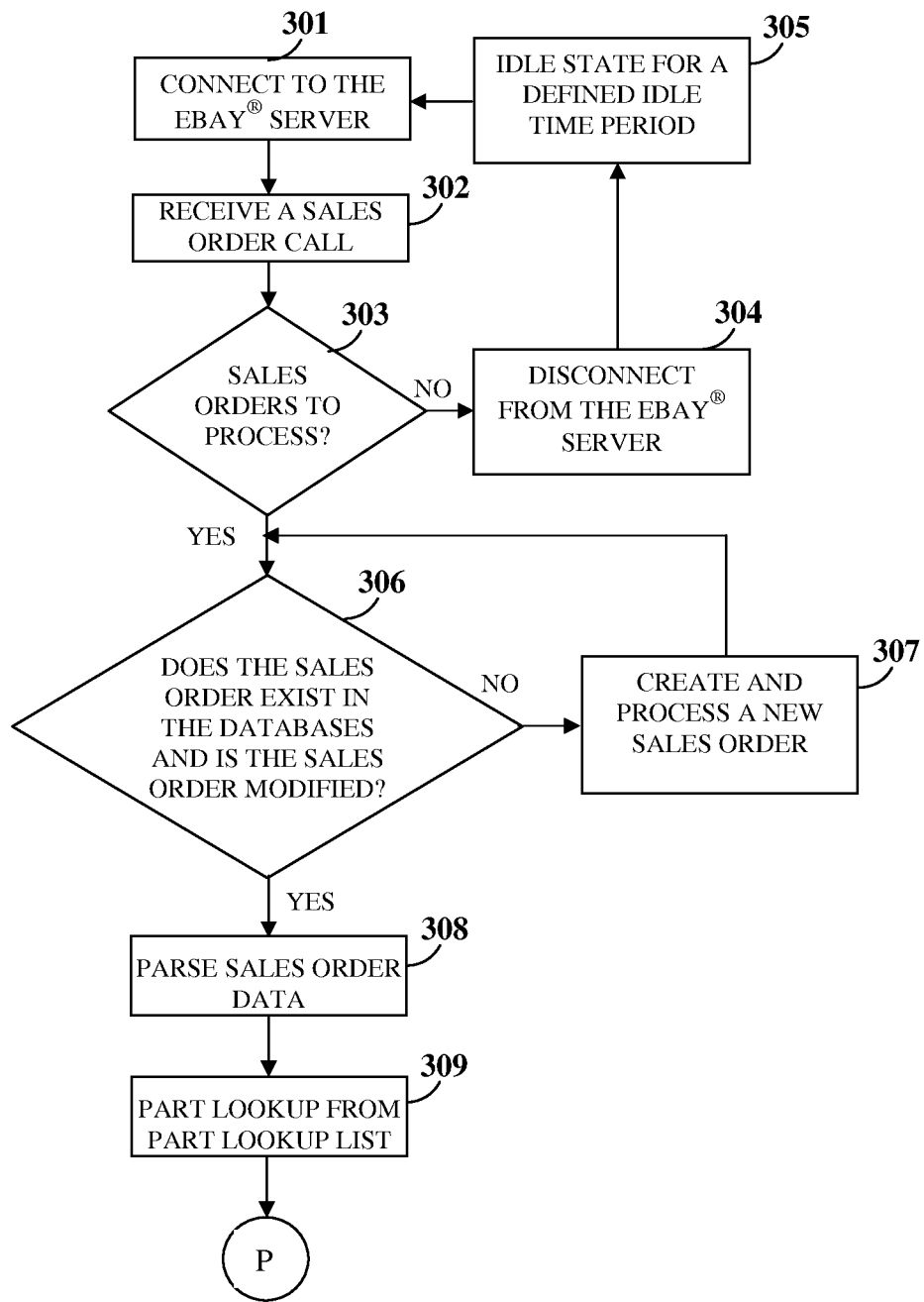
FIGS. 3A-3B exemplarily illustrate a flowchart comprising the steps performed by the sales order data collection and management system for collecting and managing sales order data from an online shopping website.
Figure 3B:
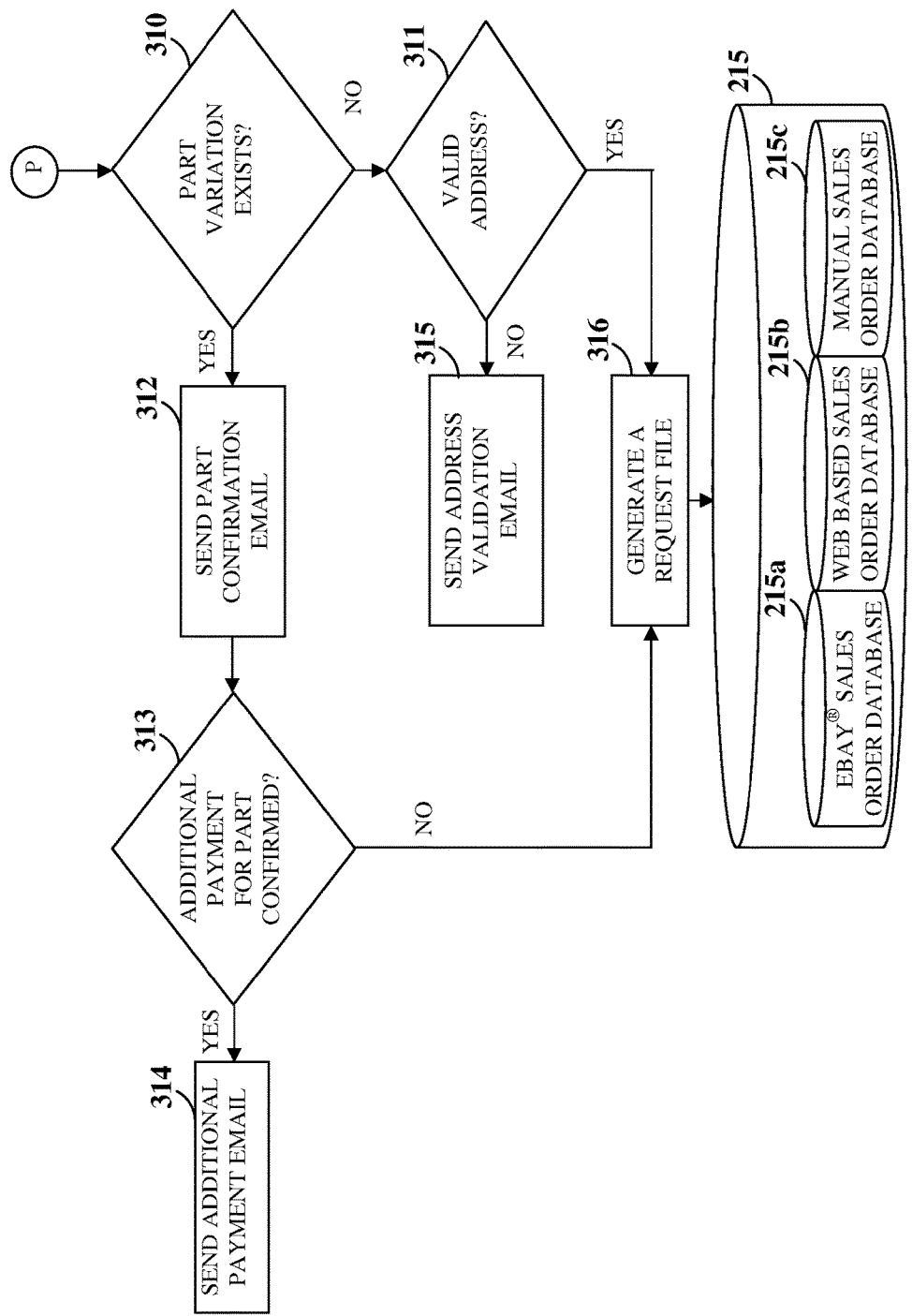

FIGS. 3A-3B exemplarily illustrate a flowchart comprising the steps performed by the sales order data collection and management system (SODCMS) for collecting and managing sales order data from an online shopping website, for example, the eBay® website of eBay, Inc. The SODCMS processes sales orders from eBay® or purchased via eBay®. The SODCMS also processes sales orders from third party consumer to consumer websites similar to eBay® in which multiple alike-in-nature product listings are not permitted. The SODCMS uses the eBay® software development kit (SDK) application programming interface (API) 213, exemplarily illustrated in FIG. 2C, to retrieve sales orders from the eBay® online shopping website. The SODCMS connects 301 to the eBay® server through the eBay® SDK API 213. The SODCMS receives a sales order call 302 and imports the sales orders of a previous day. The SODCMS checks 303 whether there are sales orders to process. If there are no sales orders to process, the SODCMS disconnects 304 from the eBay® server. The SODCMS remains 305 idle for a defined configurable time interval or a defined idle time period before connecting 301 to the eBay® server again. If there are sales orders to process, the SODCMS checks 306 whether the sales orders exist in one of the databases 215, for example, the eBay® sales order database 215a, or the web based sales order database 215b, or the manual sales order database 215c exemplarily illustrated in FIG. 3B, and whether the sales orders are modified for an updated payment or whether the sales orders are new sales orders. If the SODCMS finds that a sales order does not exist, then the SODCMS creates and processes 307 a new sales order.

If a recognized sales order is a modified payment sales order, an integration mechanism of the eBay® SDK API 213 then processes check out information and applies a "paid" status to the sales order. For eBay® sales orders, an advertised product may contain variations in parts advertised due to variations in dimensions or material in a same product design family. The variations in parts advertised also result in variations in pricing and payments. The sales order data collection and management system (SODCMS) allows consumers to select a part for a product from the parts variation list and adjust the pricing and payments accordingly. The SODCMS maintains a spreadsheet of available eBay® advertisements in a listing system, showing multiple variations in parts and pricing, for example, fixed, not fixed, etc., specific for each of the advertisements. The spreadsheet is manually or automatically constructed and updated. The SODCMS comprises a module configured to parse the spreadsheet information into the intermediate databases 215.

The sales order data collection and management system (SODCMS) parses 308 the eBay® sales orders for sales order data. The SODCMS then looks up 309 for a part number from a part lookup list to check 310 whether the sales order data corresponds to a single listing or to a listing that contains parts variation. If the sales order comprises a single listing or a single part, the SODCMS performs 311 address verification on the eBay® sales order. If the address in the sales order is valid and the payment is completed, the SODCMS applies a "processed" status to the sales order and generates 316 a corresponding request file. If the address in the sales order is invalid, the SODCMS sends 315 an address validation electronic mail (email) to a consumer. If the sales order comprises a part variation listing, the SODCMS applies a "pending" status with a "part unconfirmed" indication, and generates and sends 312 a default part confirmation email to the consumer to request a selection of the part through a hyperlink to a corresponding web form. The SODCMS parses the parts available for selection from the pre-generated spreadsheet specific for each listing containing a parts variation. Once the consumer makes a selection and submits the selection, the SODCMS confirms the part selected. The SODCMS then derives the part number and applies the derived part number to the sales order along with a status "part confirmed".

The sales order data collection and management system (SODCMS) checks 313 whether the part is confirmed for additional payment. If the consumer selection results in no price difference from what is paid on the sales order, the SODCMS approves the sales order for processing. If the consumer's selection results in a price difference from what is paid on the sales order, the SODCMS automatically creates a revised sales order invoice, generates a default additional payment email, and sends 314 the generated additional payment email to the consumer for requesting for an additional payment, for example, through PayPal®, or a direct deposit, or a credit card over the phone, or using Bitcoins. Since these payment options cannot be automatically verified through the eBay® SDK API 213, the SODCMS enables manual verification of the payments and reflects the verification checked to the corresponding sales order. The SODCMS validates the payment option and obtains a payment transaction identifier (ID) generated from the payment authorizing third party, for example, PayPal®. Once the SODCMS verifies and reflects the additional payment status and determines that there is no additional payment required, the SODCMS approves the sales order to be processed, generates 316 the corresponding request file, and stores the generated requested file in the intermediate databases 215.

On the basis of the status of the sales orders, that is, complete, pending, or incomplete, the sales order data collection and management system (SODCMS) categorizes the sales orders into three different sections. The sales orders with a complete or a processed status, that is, paid sales orders are moved to an eBay® sales order section. The SODCMS applies a "processed" status to the sales order when the delivery address is confirmed, payment is received, a part is found, part confirmation is performed, and additional payment, if any, is received. If these conditions are not satisfied, then the SODCMS applies a "pending" status to the sales orders. The sales orders with a "pending" status, that is, unpaid sales orders with a payment mode defined by consumers via an eBay® online shopping website, are moved to an eBay® pending section. The sales orders with an incomplete status, that is, unpaid sales orders where consumers define a payment mode they wish to use for their eBay® product purchase, are moved to an eBay® incomplete section. The SODCMS sends emails to consumers, if the delivery address is not verified for any of the types of sales orders, if an additional payment is not received for the eBay® sales order, and if a part is not confirmed by the consumer for the eBay® sales order. When a sales order invoice is generated, the SODCMS sends a copy of the generated sales order invoice to the consumer, for example, via email. When a sales order quotation is prepared by a sales managing entity, the SODCMS sends a copy of the sales order quotation to the consumer, for example, via email.

Figure 4:
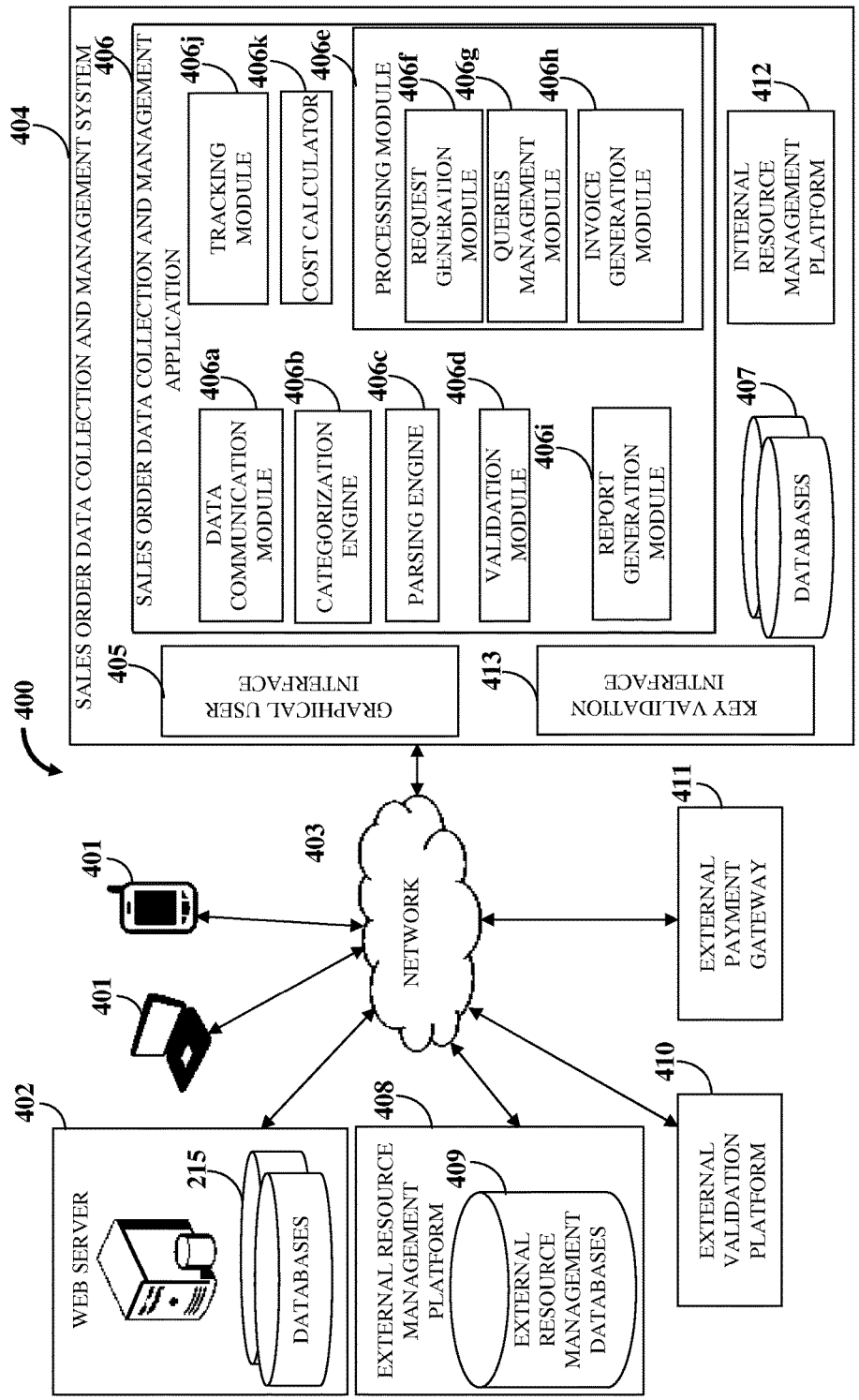
FIG. 4 exemplarily illustrates a computer implemented system for collecting and managing sales order data.

FIG. 4 exemplarily illustrates a computer implemented system 400 for collecting and managing sales order data. The computer implemented system 400 disclosed herein comprises the sales order data collection and management system (SODCMS) 404. In an embodiment, the SODCMS 404 is a web browser based system configured to communicate with a web browser accessible by a communication device 401. The SODCMS 404 communicates with a web server 402, an external resource management platform 408, an external validation platform 410, an external payment gateway 411, and one or more communication devices 401 via a network 403. The web server 402 comprises multiple databases 215, for example, the eBay® sales order database 215a, the web based sales order database 215b, the manual sales order database 215c, etc., exemplarily illustrated in FIG. 2C and FIG. 3B. The external resource management platform 408 comprises multiple external resource management databases 409, for example, an inventory tracking database, an accounting database, etc. The SODCMS 404 disclosed herein comprises a non-transitory computer readable storage medium and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium stores computer program instructions defined by modules, for example, 406a, 406b, 406c, 406d, 406e, 406f, 406g, 406h, 406i, 406j, 406k, etc., of the SODCMS 404. The processor is configured to execute the defined computer program instructions.

A user, for example, a sales managing entity accesses the sales order data collection and management system (SODCMS) 404 using a communication device 401 via the network 403. The communication device 401 is an electronic device, for example, a personal computer, a tablet computing device, a mobile computer, a smart phone, a portable computing device, a laptop, a touch centric device, a workstation, a client device, a portable electronic device, a network enabled computing device, an interactive network enabled communication device, any other suitable computing equipment, and combinations of multiple pieces of computing equipment, etc. Computing equipment may be used to implement applications such as a web browser, a mapping application, an electronic mail (email) application, etc. Computing equipment, for example, one or more servers may be associated with one or more online services. The SODCMS 404 is accessible through a broad spectrum of technologies and devices such as personal computers with access to the internet, internet enabled cellular phones, tablet communication devices, etc. The network 403 is, for example, the internet, an intranet, a wired network, a wireless network, a network that implements WiFi® of the Wi-Fi Alliance Corporation, an ultra-wideband network (UWB), a wireless universal serial bus (USB) network, a network that implements ZigBee® of ZigBee Alliance Corporation, a general packet radio service (GPRS) network, a mobile telenetwork such as a global system for mobile (GSM) communications network, a code division multiple access (CDMA) network, a third generation (3G) mobile network, a fourth generation (4G) mobile network, a long-term evolution (LTE) mobile network, a public telephone network, etc., a local area network, a wide area network, an internet connection network, an infrared network, etc., or a network formed from any combination of these networks.

The sales order data collection and management system (SODCMS) 404 comprises the sales order data collection and management application (SODCMA) 406 which is a software application comprising modules, 406a, 406b, 406c, 406d, 406e, 406f, 406g, 406h, 406i, 406j, 406k, etc., for implementing the steps of the computer implemented method disclosed herein. The SODCMS 404 provides a graphical user interface (GUI) 405 for receiving input information, for displaying, for example, statistical reports, sales order status reports, etc. The GUI 405 is, for example, a webpage of a website hosted by the SODCMS 404, an online web interface, a web based downloadable application interface, a mobile based downloadable application interface, etc. The SODCMS 404 also provides a key validation interface 413 for receiving input information, for example, a hot key for manual address verification. The SODCMS 404 comprises a data communication module 406a, a categorization engine 406b, a parsing engine 406c, one or more databases 407, a validation module 406d, a processing module 406e, and in an embodiment, an internal resource management platform 412.

The data communication module 406a receives sales order data from one or more of multiple sources. In an embodiment, the data communication module 406a defines configurable time intervals for receiving one or more of the sales order data from one or more of the sources. The data communication module 406a periodically accesses the web server 402 via the network 403 at the defined configurable time intervals for receiving the sales order data. In an embodiment, the GUI 405 allows a sales managing entity to manually access the web server 402 via the network 403 at periodic time intervals for accessing one or more of the sales order data from the sources.

The categorization engine 406b categorizes the received sales order data based on a type of each source. The parsing engine 406c parses the categorized sales order data based on the filtering criteria associated with each source. The databases 407 associated with each source store the parsed sales order data. The databases 407 are any storage area or medium that can be used for storing data and files. The databases 407 are, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database, the Cassandra database of the Apache Software Foundation, the HBase™ database of the Apache Software Foundation, etc. In an embodiment, the databases 407 can also be a location on a file system. The validation module 406d validates the stored sales order data against validation criteria associated with each source. In an embodiment, the data communication module 406a receives the validation of one or more of the stored sales order data against the validation criteria from the external validation platform 410. In another embodiment, the data communication module 406a receives a manual validation of one or more of the stored sales order data against the validation criteria from a sales managing entity via the key validation interface 413. In an embodiment, the data communication module 406a renders messages to communication devices 401 of consumers based on the validation of the stored sales order data. The rendered messages comprise, for example, information on modifications and discrepancies associated with the sales order data.

In an embodiment, the validation module 406d maintains a spreadsheet of parts variation of each product extracted from the received sales order data. The validation module 406d validates the stored sales order data by verifying a sales order for a single listing or a listing with parts variation of a product against the spreadsheet of parts variation of each product maintained by the validation module 406d. The processing module 406e comprises a request generation module 406f for generating a request message against an address associated with the sales order requesting a selection of the product with the parts variation, if the sales order is for the listing with the parts variation. The processing module 406e further comprises an invoice generation module 406h for generating a revised invoice to account for a price difference due to the selection of the product with the parts variation. The data communication module 406a, in communication with the invoice generation module 406h, transmits the revised invoice to a communication device 401 of a consumer for receiving additional payment through one or more of multiple payment modes from the consumer based on the price difference.

After validation of the stored sales order data, the processing module 406e processes the validated sales order data for transmission to the internal resource management platform 412 and/or the external resource management platform 408. The request generation module 406f of the processing module 406e generates a request file associated with the validated sales order data. The data communication module 406a, in communication with the request generation module 406f, transmits the generated request file to the internal resource management platform 412 and/or the external resource management platform 408. In an embodiment, the sales order data collection and management system (SODCMS) 404 further comprises a tracking module 406j for tracking a status of a sales order. The categorization engine 406b categorizes the received sales order data based on the status extracted from the received sales order data for processing the sales order. In an embodiment, the request generation module 406f generates requests for processing the received sales order data based on the status extracted from the received sales order data. In an embodiment, the SODCMS 404 further comprises a report generation module 406i for generating and communicating an analytics report associated with the sales order data to a sales managing entity. The analytics report is configured to report statistics and statuses from the sales order data.

In an embodiment, the processing module 406e further comprises a queries management module 406g for extracting frequent queries from the received sales order data, automatically executing the extracted frequent queries, and processing responses to the executed frequent queries. The sales order data collection and management system (SODCMS) 404 further comprises a cost calculator 406k for calculating a cost from a sales order associated with the validated sales order data for determining a total cost of a product of the sales order. In an embodiment, the processing module 406e integrates with the external payment gateway 411 for dynamically validating and processing a payment associated with the stored sales order data, received through one or more of multiple payment modes based on a preliminary invoice extracted from the received sales order data or a revised invoice generated by the invoice generation module 406h of the processing module 406e. In an embodiment, the data communication module 406a receives a payment confirmation message from the external payment gateway 411 for validating the stored sales order data against the validation criteria.

Figure 5:
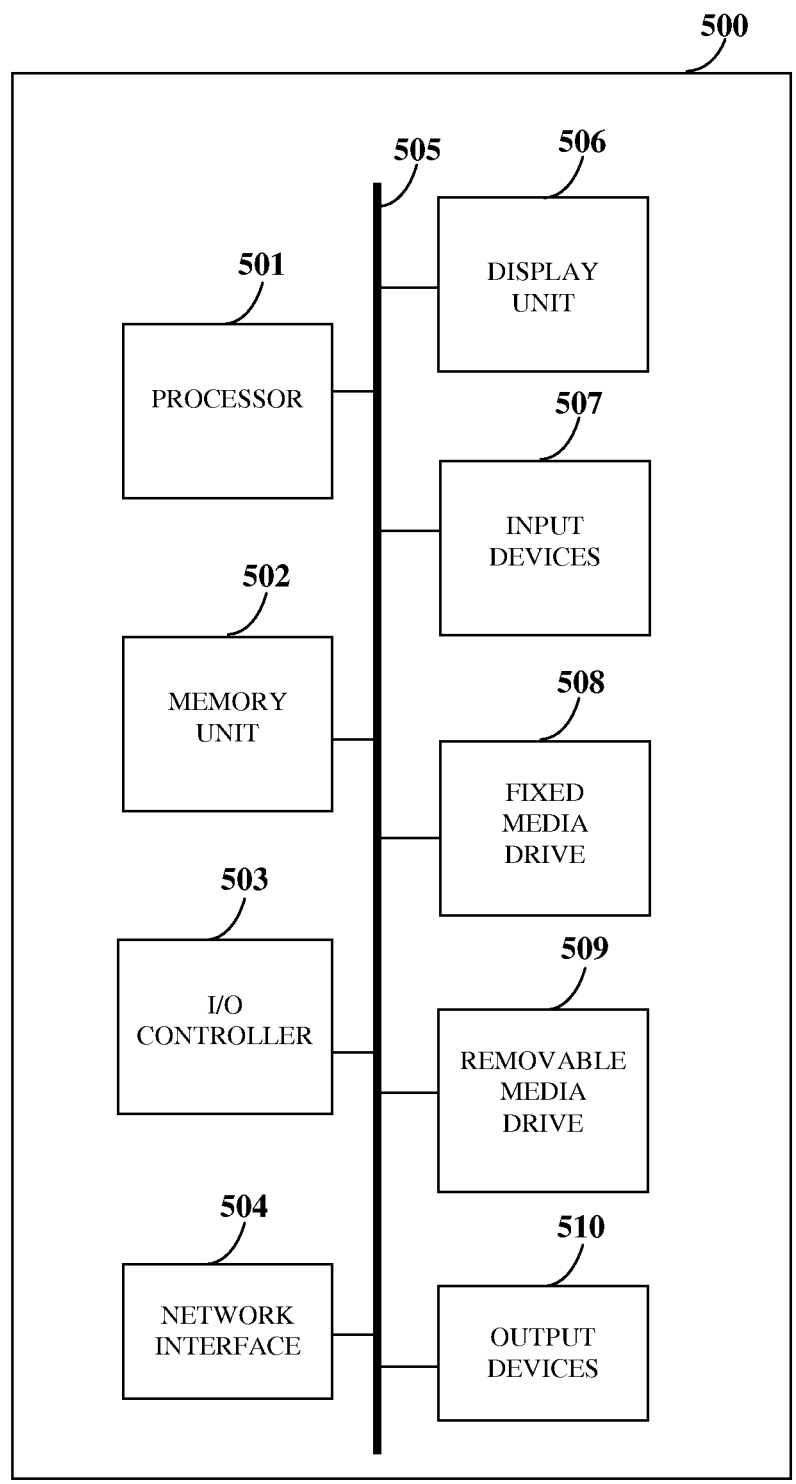
FIG. 5 exemplarily illustrates the architecture of a computer system employed by the sales order data collection and management system for collecting and managing sales order data.

FIG. 5 exemplarily illustrates the architecture of a computer system 500 employed by the sales order data collection and management system (SODCMS) 404 exemplarily illustrated in FIG. 4, for collecting and managing sales order data. The SODCMS 404 of the computer implemented system 400 exemplarily illustrated in FIG. 4, employs the architecture of the computer system 500 exemplarily illustrated in FIG. 5. The computer system 500 is programmable using a high level computer programming language. The computer system 500 may be implemented using programmed and purposeful hardware. The SODCMS 404 communicates with the communication devices 401 exemplarily illustrated in FIG. 4, of each of the users, for example, consumers, sales managing entities, etc., registered with the SODCMS 404 via a network 403, for example, a short range network or a long range network.

The computer system 500 comprises, for example, a processor 501, a non-transitory computer readable storage medium such as a memory unit 502 for storing programs and data, an input/output (I/O) controller 503, a network interface 504, a data bus 505, a display unit 506, input devices 507, a fixed media drive 508, a removable media drive 509 for receiving removable media, output devices 510, etc. The processor 501 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 501 may also be implemented as a processor set comprising, for example, a general purpose microprocessor and a math or graphics co-processor. The processor 501 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The sales order data collection and management system (SODCMS) 404 disclosed herein is not limited to a computer system 500 employing a processor 501. The computer system 500 may also employ a controller or a microcontroller. The processor 501 executes the modules, for example, 406a, 406b, 406c, 406d, 406e, 406f, 406g, 406h, 406i, 406j, 406k, etc., of the SODCMS 404 exemplarily illustrated in FIG. 4.

The memory unit 502 is used for storing programs, applications, and data. For example, the data communication module 406a, the categorization engine 406b, the parsing engine 406c, the validation module 406d, the processing module 406e with the request generation module 406f, the queries management module 406g, and the invoice generation module 406h, the report generation module 406i, the tracking module 406j, the cost calculator 406k, etc., are stored in the memory unit 502 of the computer system 500. The memory unit 502 is, for example, a random access memory (RAM) or another type of dynamic storage device that stores information and instructions for execution by the processor 501. The memory unit 502 also stores temporary variables and other intermediate information used during execution of the instructions by the processor 501. The computer system 500 further comprises a read only memory (ROM) or another type of static storage device that stores static information and instructions for the processor 501. The I/O controller 503 controls input actions and output actions performed by the SODCMS 404.

The network interface 504 enables connection of the computer system 500 to the network 403. For example, the sales order data collection and management system (SODCMS) 404 connects to the network 403 via the network interface 504. In an embodiment, the network interface 504 is provided as an interface card also referred to as a line card. The network interface 504 comprises, for example, one or more of an infrared (IR) interface, an interface implementing Wi-Fi® of the Wi-Fi Alliance Corporation, a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 505 permits communications between the modules, for example, 405, 406a, 406b, 406c, 406d, 406e, 406f, 406g, 406h, 406i, 406j, 406k, 407, 412, 413, etc., of the SODCMS 404.

The display unit 506, via the graphical user interface (GUI) 405 exemplarily illustrated in FIG. 4, displays information, display interfaces, user interface elements such as text fields, checkboxes, text boxes, windows, etc., for allowing a consumer or a sales managing entity to enter payment information for payment verification, address details for address validation, etc. The display unit 506 comprises, for example, a liquid crystal display, a plasma display, an organic light emitting diode (OLED) based display, etc. The input devices 507 are used for inputting data into the computer system 500. The sales managing entity, for example, an administrator of the sales order data collection and management system (SODCMS) 404 uses the input devices 507 to provide inputs to the SODCMS 404. For example, an administrator may enter address details, payment information, etc., using the input devices 507. The input devices 507 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 500. The programs are loaded onto the fixed media drive 508 and into the memory unit 502 of the computer system 500 via the removable media drive 509. In an embodiment, the computer applications and programs may be loaded directly via the network 403. Computer applications and programs are executed by double clicking a related icon displayed on the display unit 506 using one of the input devices 507. The output devices 510 output the results of operations performed by the sales order data collection and management system (SODCMS) 404. For example, the SODCMS 404 provides analytics reports comprising statistics and statuses of the sales orders to administrators using the output devices 510. The SODCMS 404 displays the generated analytics reports using the output devices 510.

The processor 501 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android operating system, the Windows Phone® operating system of Microsoft Corporation, the BlackBerry® operating system of Research in Motion Limited, the iOS operating system of Apple Inc., the Symbian® operating system of Symbian Foundation Limited, etc. The computer system 500 employs the operating system for performing multiple tasks. The operating system is responsible for management and coordination of activities and sharing of resources of the computer system 500. The operating system further manages security of the computer system 500, peripheral devices connected to the computer system 500, and network connections. The operating system employed on the computer system 500 recognizes, for example, inputs provided by the users such as sales managing entities, etc., using one of the input devices 507, the output display, files, and directories stored locally on the fixed media drive 508, for example, a hard drive. The operating system on the computer system 500 executes different programs using the processor 501. The processor 501 and the operating system together define a computer platform for which application programs in high level programming languages are written.

The processor 501 of the computer system 500 employed by the sales order data collection and management system (SODCMS) 404 retrieves instructions defined by the data communication module 406a, the categorization engine 406b, the parsing engine 406c, the validation module 406d, the request generation module 406f, the queries management module 406g, and the invoice generation module 406h of the processing module 406e, the report generation module 406i, the tracking module 406j, the cost calculator 406k, etc., of the SODCMS 404 for performing respective functions disclosed in the detailed description of FIG. 4. The processor 501 retrieves instructions for executing the modules, for example, 406a, 406b, 406c, 406d, 406e, 406f, 406g, 406h, 406i, 406j, 406k, etc., of the SODCMS 404 from the memory unit 502. A program counter determines the location of the instructions in the memory unit 502. The program counter stores a number that identifies the current position in the program of each of the modules, for example, 406a, 406b, 406c, 406d, 406e, 406f, 406g, 406h, 406i, 406j, 406k, etc., of the SODCMS 404. The instructions fetched by the processor 501 from the memory unit 502 after being processed are decoded. The instructions are stored in an instruction register in the processor 501. After processing and decoding, the processor 501 executes the instructions, thereby performing one or more processes defined by those instructions.

At the time of execution, the instructions stored in the instruction register are examined to determine the operations to be performed. The processor 501 then performs the specified operations. The operations comprise arithmetic operations and logic operations. The operating system performs multiple routines for performing a number of tasks required to assign the input devices 507, the output devices 510, and memory for execution of the modules, for example, 406a, 406b, 406c, 406d, 406e, 406f, 406g, 406h, 406i, 406j, 406k, etc., of the sales order data collection and management system (SODCMS) 404. The tasks performed by the operating system comprise, for example, assigning memory to the modules, for example, 406a, 406b, 406c, 406d, 406e, 406f, 406g, 406h, 406i, 406j, 406k, etc., of the SODCMS 404, and to data used by the SODCMS 404, moving data between the memory unit 502 and disk units, and handling input/output operations. The operating system performs the tasks on request by the operations and after performing the tasks, the operating system transfers the execution control back to the processor 501. The processor 501 continues the execution to obtain one or more outputs. The outputs of the execution of the modules, for example, 406a, 406b, 406c, 406d, 406e, 406f, 406g, 406h, 406i, 406j, 406k, etc., of the SODCMS 404 are displayed on the display unit 506 to a user, for example, a sales managing entity.

For purposes of illustration, the detailed description refers to the sales order data collection and management system (SODCMS) 404 being run locally on the computer system 500; however the scope of the computer implemented method and system 400 disclosed herein is not limited to the SODCMS 404 being run locally on the computer system 500 via the operating system and the processor 501, but may be extended to run remotely over the network 403 by employing a web browser and a remote server, a mobile phone, or other electronic devices. One or more portions of the computer system 500 may be distributed across one or more computer systems (not shown) coupled to the network 403.

Disclosed herein is also a computer program product comprising a non-transitory computer readable storage medium that stores computer program codes comprising instructions executable by at least one processor 501 for collecting and managing sales order data. The computer program product comprises a first computer program code for receiving sales order data from one or more of multiple sources; a second computer program code for categorizing the received sales order data based on a type of each source; a third computer program code for parsing the categorized sales order data based on filtering criteria associated with each source; a fourth computer program code for storing the parsed sales order data in one or more databases 407 exemplarily illustrated in FIG. 4, associated with each source; a fifth computer program code for validating the stored sales order data against validation criteria associated with each source; and a sixth computer program code for processing the validated sales order data for transmission to the internal resource management platform 412 and/or the external resource management platform 408 exemplarily illustrated in FIG. 4. In an embodiment, the sixth computer program code comprises a seventh computer program code for generating a request file associated with the validated sales order data; and an eighth computer program code for transmitting the generated request file to the internal resource management platform 412 and/or an external resource management platform 408. The computer program product disclosed herein further comprises a ninth computer program code for generating a revised invoice to account for a price difference due to a selection of a product with parts variation and a tenth computer program code for transmitting the revised invoice to a communication device 401 of a consumer for receiving additional payment through one or more of multiple payment modes from the consumer based on the price difference. The computer program product disclosed herein further comprises one or more additional computer program codes for performing additional steps that may be required and contemplated for collecting and managing sales order data. In an embodiment, a single piece of computer program code comprising computer executable instructions performs one or more steps of the computer implemented method disclosed herein for collecting and managing sales order data.

The computer program codes comprising computer executable instructions are embodied on the non-transitory computer readable storage medium. The processor 501 of the computer system 500 retrieves these computer executable instructions and executes them. When the computer executable instructions are executed by the processor 501, the computer executable instructions cause the processor 501 to perform the steps of the computer implemented method for collecting and managing sales order data.

Figure 6:
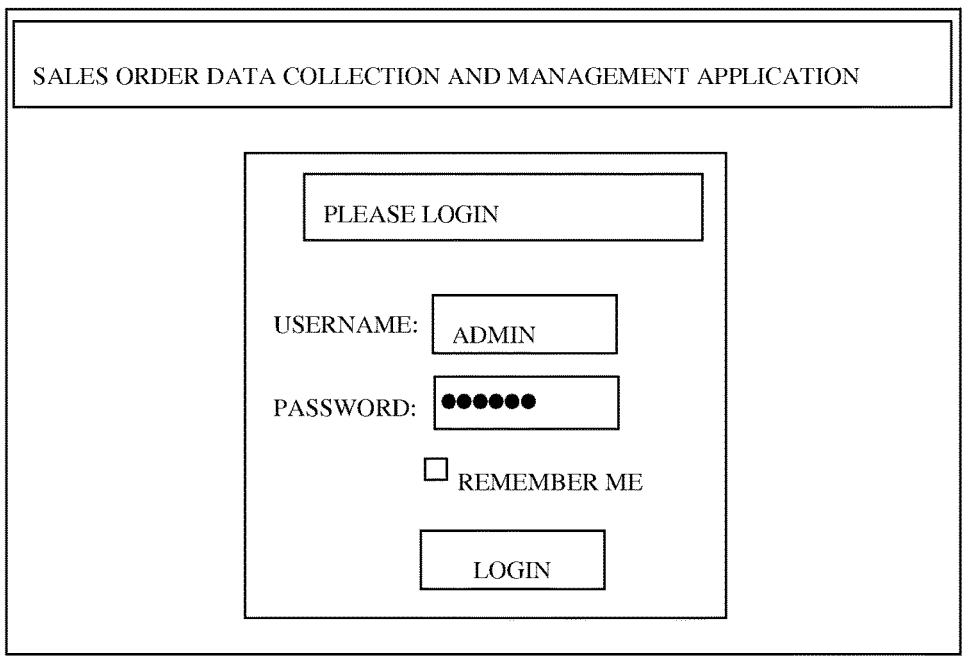
FIG. 6 exemplarily illustrates a screenshot of a graphical user interface provided by the sales order data collection and management system for logging a user into the sales order data collection and management system.

FIG. 6 exemplarily illustrates a screenshot of a graphical user interface (GUI) 405 provided by the sales order data collection and management system (SODCMS) 404 exemplarily illustrated in FIG. 4, for logging a user, for example, a sales managing entity into the SODCMS 404. The SODCMS 404 receives login identifiers or identity indicators from the user via the GUI 405 for logging the user into the SODCMS 404 as exemplarily illustrated in FIG. 6. The login identifiers or identity indicators comprise, for example, a username and a password. The SODCMS 404 allows authenticated access through a cloud computing environment, thereby eliminating any dependency on a specific work station. As soon as the SODCMS 404 authenticates the login identifiers, the SODCMS 404 displays a homepage as exemplarily illustrated in FIG. 7A, to the user.

FIGS. 7A-7C exemplarily illustrate screenshots of a graphical user interface (GUI) 405 provided by the sales order data collection and management system (SODCMS) 404 exemplarily illustrated in FIG. 4, showing menu lists and a sales order records section. FIG. 7A exemplarily illustrates a homepage provided by the SODCMS 404. The homepage displays a menu list as exemplarily illustrates in FIG. 7B, and a sales order records section as exemplarily illustrates in FIG. 7C. FIG. 7B exemplarily illustrates a menu list comprising links to different sales order records, sales quotes, and payment records. The menu list provides links to processed and pending website sales orders, completed or processed eBay® sales orders, pending eBay® sales orders, incomplete eBay® sales orders, manual sales orders, links to create and view manual sales orders and sales quotes, etc. The menu list also provides payment records for different modes of payment. The different modes for payment are, for example, credit card, PayPal® of PayPal, Inc., ECheque through PayPal®, cash, bank deposit, etc. FIG. 7C exemplarily illustrates sales order records showing pending and processed web based sales orders received by the SODCMS 404 via electronic mail (email), sales orders from online shopping websites, for example, eBay®, and manually entered sales orders. A sales order records section on the home page exemplarily illustrated in FIG. 7A, shows the status of the sales orders received from different sources. The sales order records section provides information, for example, about a number of pending sales orders, a number of processed sales orders, and the total number of sales orders. The SODCMS 404 marks the sales orders as pending, for example, if a total payment for a sales order is not completed or a delivery address is not confirmed. The SODCMS 404 marks the sales orders as processed, for example, if a total payment for a sales order is completed and a delivery address is confirmed.

Figure 8:
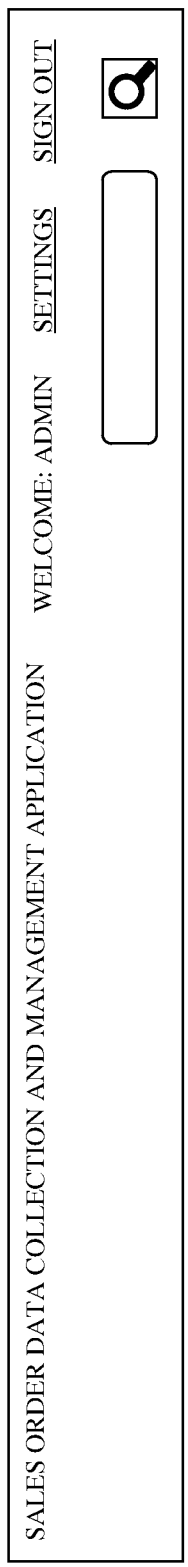
FIG. 8 exemplarily illustrates a screenshot of a header section of a graphical user interface provided by the sales order data collection and management system.

FIG. 8 exemplarily illustrates a screenshot of a header section of a graphical user interface (GUI) 405 provided by the sales order data collection and management system (SODCMS) 404 exemplarily illustrated in FIG. 4. The header section displays a login username, a link to change settings, a search filter, a search box, and a sign out link to log out from the SODCMS 404.

Figure 9A:
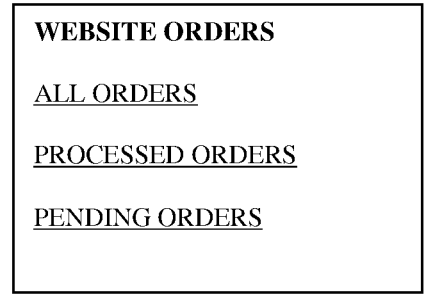

FIGS. 9A-9D exemplarily illustrate screenshots of a graphical user interface (GUI) 405 provided by the sales order data collection and management system (SODCMS) 404 exemplarily illustrated in FIG. 4, for collecting and managing sales order data from web based sales orders. FIG. 9A exemplarily illustrates a website sales orders section of the menu list exemplarily illustrated in FIG. 7B. The SODCMS 404 processes the sales orders made from websites. When sales orders are created at a website, the website sends electronic mails (emails) of the created sales orders to a mail box maintained by the SODCMS 404 corresponding to those sales orders. The SODCMS 404 parses the mail box and fetches the email sales orders having a subject line "Order receipt confirmation of your order". The SODCMS 404 marks the order status of an email sales order as processed, when the delivery address of the email sales order is valid and a payment received email is received, for example, with one of the following subject lines: "receipt of approved purchase or payment", "notification of an instant payment received", "notification of payment received", and "notification of a cleared ECheque payment received". The SODCMS 404 marks the order status of an email sales order as pending, if any of the above conditions are not fulfilled.

The website sales orders section provides links to view a list of all sales orders made on a website or received through electronic mails (emails) from online shopping websites. The "All orders" link displays a list of all email sales orders having a pending status or a processed status as exemplarily illustrated in FIG. 9B. The "Processed Orders" link displays a list of processed email sales orders as exemplarily illustrated in FIG. 9C. The sales order data collection and management system (SODCMS) 404 moves an email sales order to the processed list only when a total payment for the email sales order is completed and a delivery address for the email sales order is verified. The "Pending Orders" link displays a list of pending email sales orders as exemplarily illustrated in FIG. 9D. The SODCMS 404 moves an email sales order to the pending list, if a total payment for the email sales order is not completed and/or a delivery address for the email sales order is not verified.

Figure 10A:
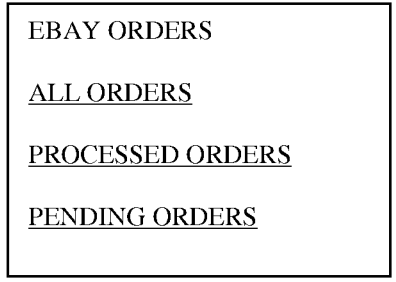

FIGS. 10A-10D exemplarily illustrate screenshots of a graphical user interface (GUI) 405 provided by the sales order data collection and management system (SODCMS) 404 exemplarily illustrated in FIG. 4, for collecting and managing sales order data from an online shopping website, for example, eBay®. The SODCMS 404 retrieves eBay® sales orders from the eBay® website using the eBay® application programming interface (API), for example, ebay.sdk.call.GetOrdersCall. The SODCMS 404 imports a previous day's sales orders using the eBay® API and checks whether the sales orders exist. If the sales orders do not exist, the SODCMS 404 creates a new sales order and processes the new sales order. FIG. 10A exemplarily illustrates an eBay® sales orders section of the menu list exemplarily illustrated in FIG. 7B. The "All orders" link displays a list of all pending or processed eBay® sales orders as exemplarily illustrated in FIG. 10B. The "Processed Orders" link displays a list of all the processed eBay® sales orders as exemplarily illustrated in FIG. 10C. The SODCMS 404 moves an eBay® sales order to the processed list only when the payment is received, the address is verified, part confirmation is complete, and the additional payment is received. The SODCMS 404 receives a status of payment when the sales order is retrieved from the eBay® website. The "Pending Orders" link displays a list of pending eBay® sales orders as exemplarily illustrated in FIG. 10D. The SODCMS 404 moves an eBay® sales order to the pending list, if the total payment for the eBay® sales order is not received, the delivery address is not verified, part confirmation is not performed, that is, if the ordered part is not confirmed, additional payment is not received, or if the part number of the ordered product on the sales order is not found. The payment verification is considered as incomplete when a consumer has not made the full payment. The address verification is considered as incomplete when the delivery address of the consumer is not verified. Furthermore, if the part number of the ordered part is not confirmed or not found in the intermediate databases 215, exemplarily illustrated in FIG. 2C and FIG. 3B, or if the sales order requires additional payment which is not made by the consumer, the SODCMS 404 changes the status of the eBay® sales order to pending.

Figure 11E:
Figure 11F:
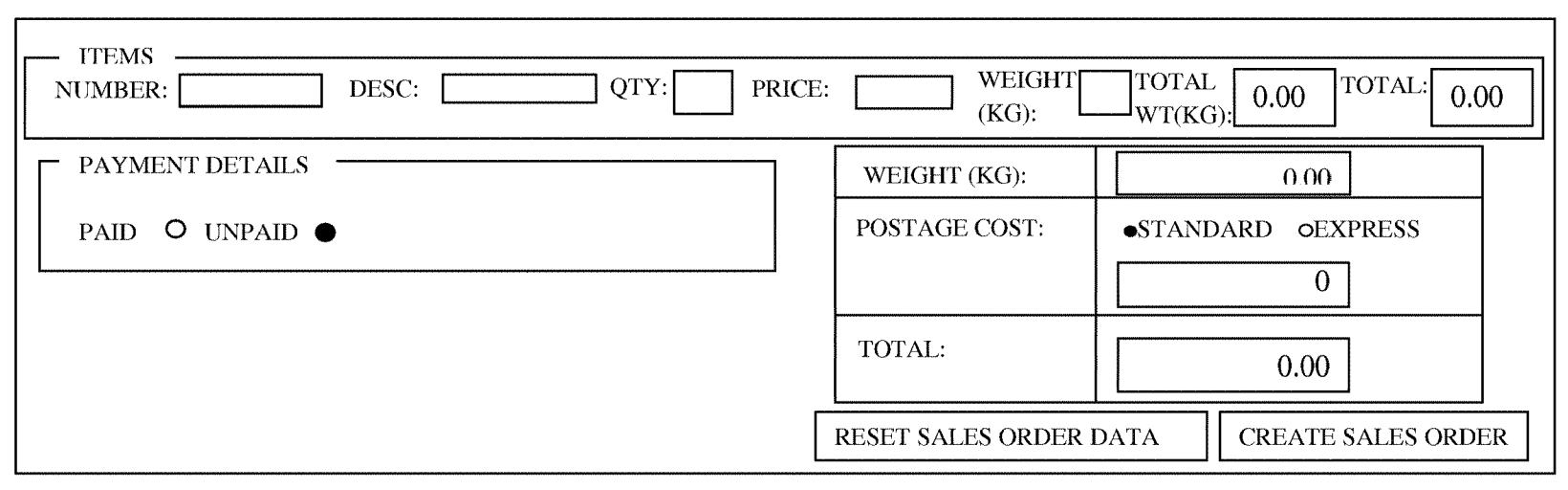

FIGS. 11A-11F exemplarily illustrate screenshots of a graphical user interface (GUI) 405 provided by the sales order data collection and management system (SODCMS) 404 exemplarily illustrated in FIG. 4, for collecting and managing manually entered sales order data. FIG. 11A exemplarily illustrates a manual sales orders section of the menu list exemplarily illustrated in FIG. 7B. The manual sales orders section comprises records of all sales orders created manually by a user, for example, a sales managing entity such as an administrator by filling a web form, and provides a link for creating manual sales orders. The "All orders" link displays a list of all pending and processed sales orders created manually by the user using the SODCMS 404 as exemplarily illustrated in FIG. 11B. The SODCMS 404 marks the order status of a manually created sales order as processed, when the delivery address of the manually created sales order is valid and payment is received. The "Processed Orders" link displays a list of manually created and processed sales orders as exemplarily illustrated in FIG. 11C. The SODCMS 404 moves the manually created sales orders to the processed list, when the total payment is made and the delivery address is verified.

The sales order data collection and management system (SODCMS) 404 marks the order status of a manually created sales order as pending, when the delivery address of the manually created sales order is not valid and/or the total payment for the manually created sales order is not received. The "Pending Orders" link displays a list of manually created and pending sales orders as exemplarily illustrated in FIG. 11D. The SODCMS 404 moves the manually created sales orders to the pending list when the total payment is not made and/or the delivery address is not verified. The "Create manual orders" link displays a web form for creating a new manual sales order as exemplarily illustrated in FIGS. 11E-11F. When the user clicks on a "Suggest Address" link exemplarily illustrated in FIG. 11E, on the GUI 405, the SODCMS 404 checks whether the delivery address provided in the web form is valid or not. When a user fills up the web form and then clicks on a "Create Sales Order" button exemplarily illustrated in FIG. 11F, on the GUI 405, the SODCMS 404 creates a new manual sales order. When the user clicks on a "Reset Sales Order Data" button exemplarily illustrated in FIG. 11F, on the GUI 405, the SODCMS 404 resets the web form.

Figures 12A, 12B:
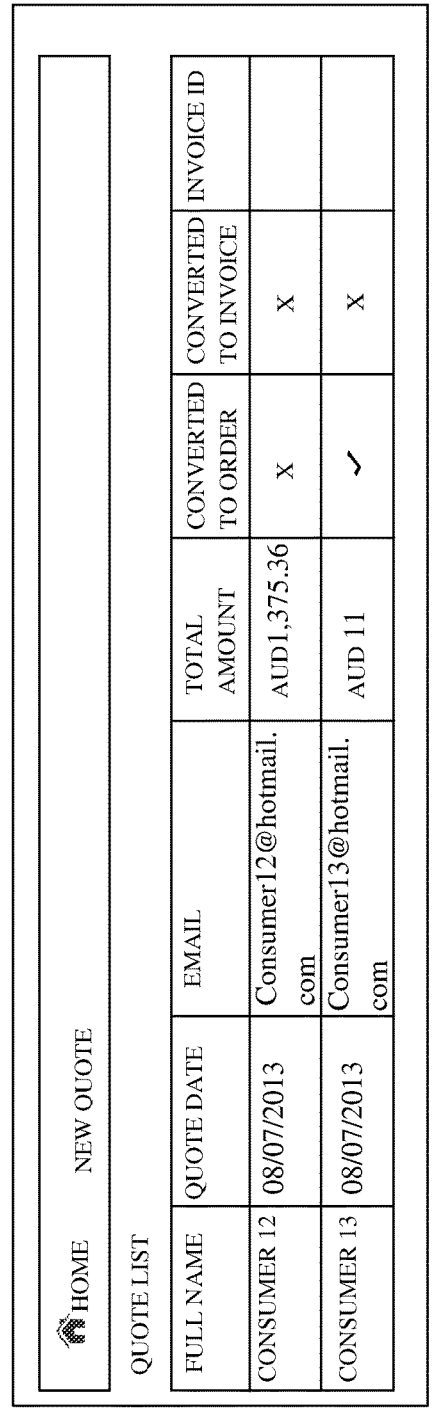
Figure 12C:
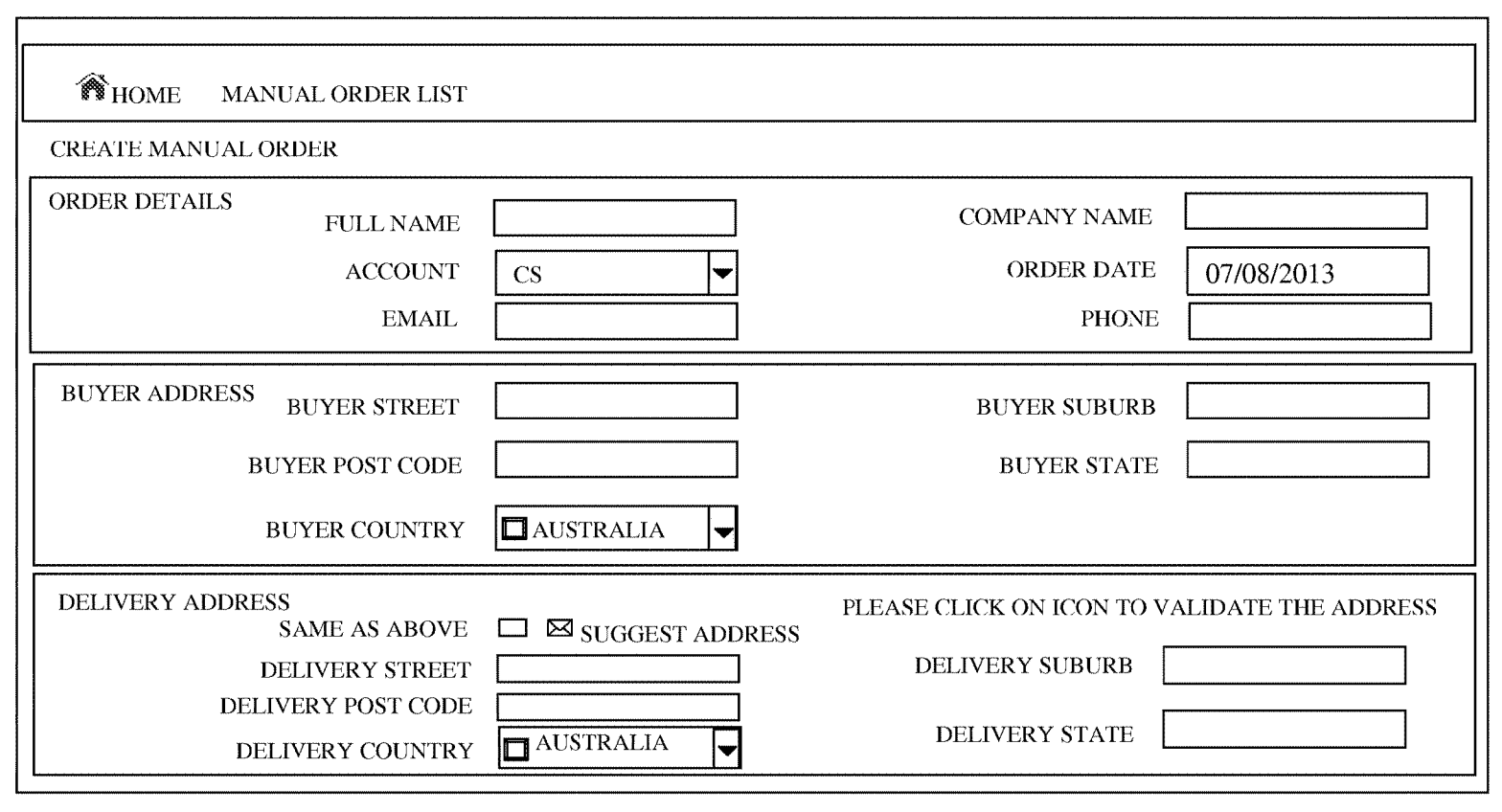
Figure 12D:
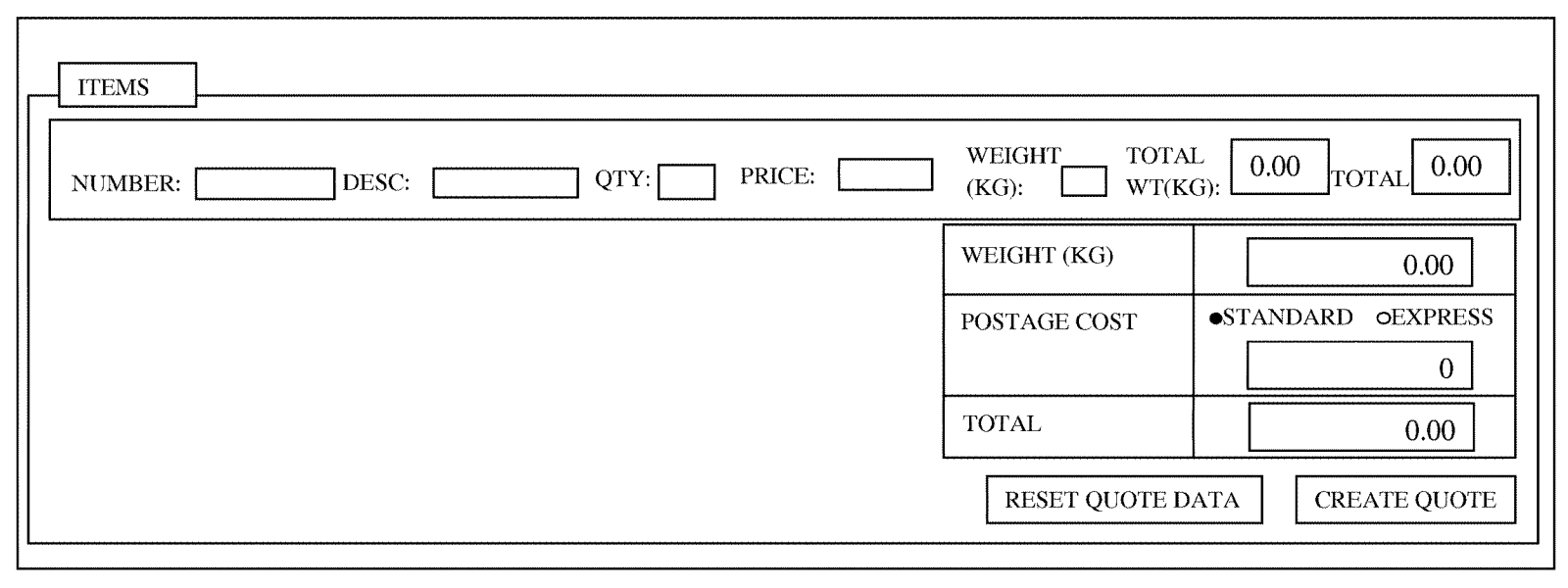

FIGS. 12A-12D exemplarily illustrate screenshots of a graphical user interface (GUI) 405 provided by the sales order data collection and management system (SODCMS) 404 exemplarily illustrated in FIG. 4, for creating and managing sales quotes. FIG. 12A exemplarily illustrates a quotes section of the menu list exemplarily illustrated in FIG. 7B. The quotes section provides links to view a list of quotes and create new quotes. The "All quotes" link displays a list of all the sales quotes prepared by a sales managing entity, for example, an administrator, as exemplarily illustrated in FIG. 12B. A "New quote" link exemplarily illustrated in FIG. 12B, provided on the GUI 405, displays a web form for creating a new sales quote as exemplarily illustrated in FIGS. 12C-12D. When the sales managing entity creates a sales quote and clicks on a "Create Quote" button exemplarily illustrated in FIG. 12D, on the GUI 405, the SODCMS 404 automatically creates the sales quote, generates an electronic mail (email), and sends the generated email to a consumer. When the user clicks on a "Reset Quote Data" button exemplarily illustrated in FIG. 12D, on the GUI 405, the SODCMS 404 resets the web form.

Figure 13F:
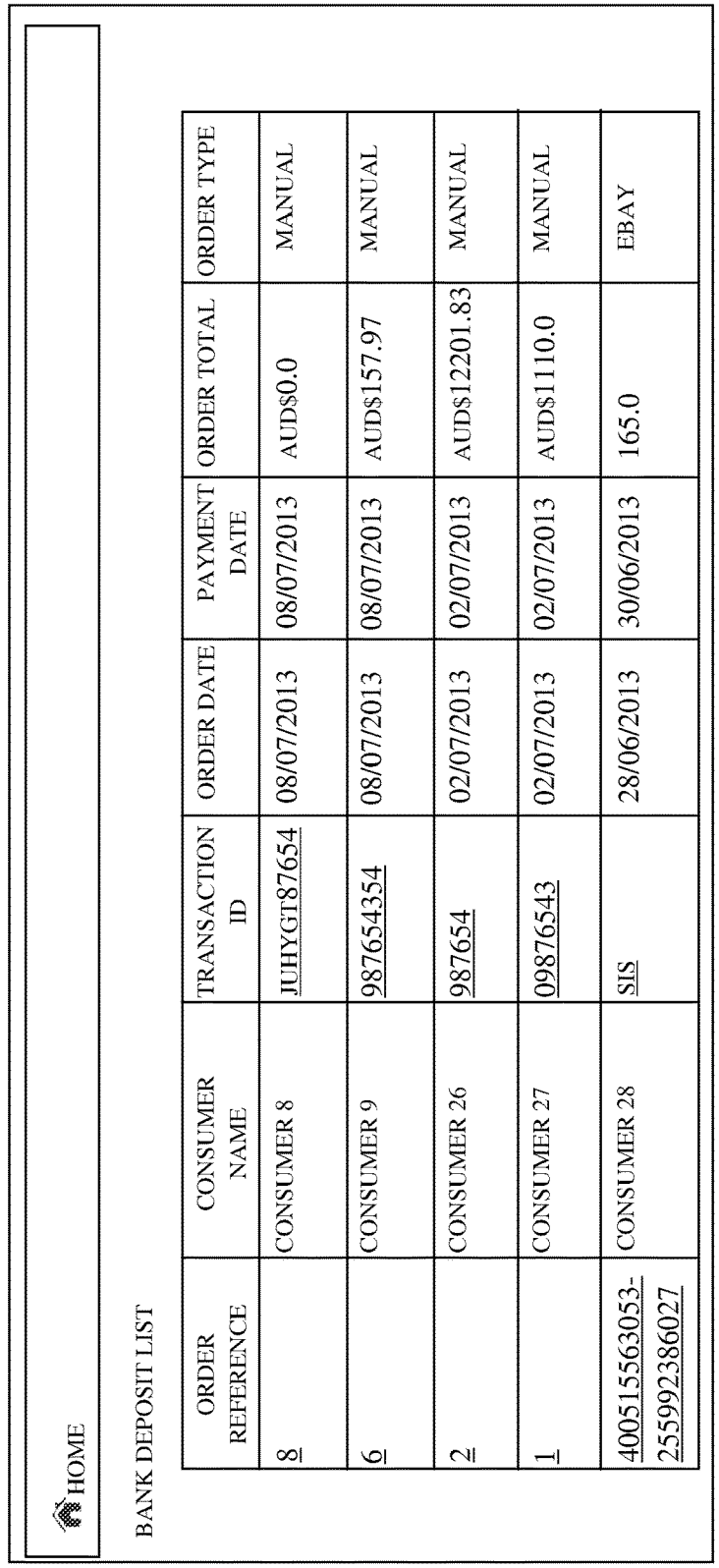
Figure 15A:
Figure 15B:
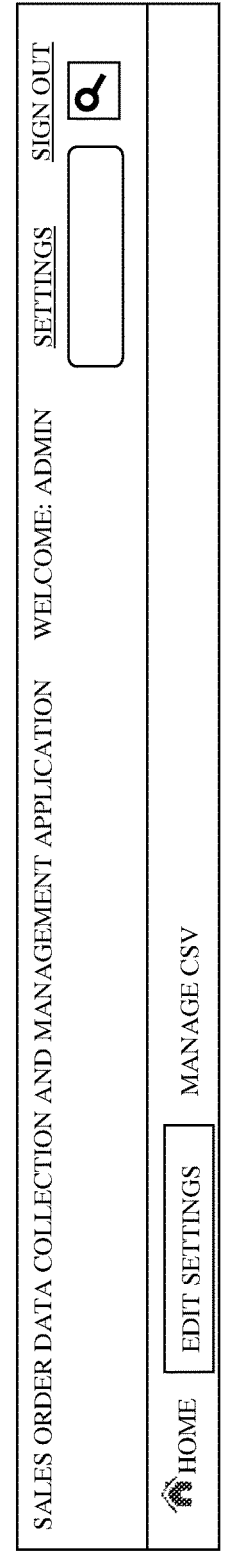

FIGS. 13A-13F exemplarily illustrate screenshots of a graphical user interface (GUI) 405 provided by the sales order data collection and management system (SODCMS) 404 exemplarily illustrated in FIG. 4, for viewing payments associated with sales orders in multiple modes. FIG. 13A exemplarily illustrates a view payments section of the menu list exemplarily illustrated in FIG. 7B. The view payments section provides links to view a list of sales orders according to the payment methods used, for example, credit card and/or eWAY® payments, PayPal® Direct payments, PayPal® ECheque payments, cash payments, and bank deposit payments. A "Credit card/eWAY" link on the GUI 405 displays a list of sales orders with payments processed through an external payment gateway 411 exemplarily illustrated in FIG. 4, such as eWAY® as exemplarily illustrated in FIG. 13B. A "PayPal Direct" link on the GUI 405 displays a list of sales orders with payments processed through PayPal® Direct as exemplarily illustrated in FIG. 13C. A "PayPal ECheque" link on the GUI 405 displays a list of sales orders with payments processed through the PayPal® ECheque payment option as exemplarily illustrated in FIG. 13D. A "Cash Payment" link on the GUI 405 displays a list of sales orders with payments processed through cash payments as exemplarily illustrated in FIG. 13E. A "Bank Deposit" link on the GUI 405 displays a list of sales orders with payments processed through bank deposits as exemplarily illustrated in FIG. 13F.

FIGS. 14A-14E exemplarily illustrate screenshots of a graphical user interface (GUI) 405 provided by the sales order data collection and management system (SODCMS) 404 exemplarily illustrated in FIG. 4, for manually approving pending sales orders. The SODCMS 404 provides multiple features, for example, electronic mail (email) services, manual approval of pending sales orders as exemplarily illustrated in FIGS. 14A-14E, customization of configuration settings as exemplarily illustrated in FIGS. 15A-15D, search options as exemplarily illustrated in FIGS. 16A-16C, print options as exemplarily illustrated in FIG. 17, auto-complete options for manual sales order and sales quote web forms as exemplarily illustrated in FIGS. 18A-18B, an interface exemplarily illustrated in FIGS. 19A-19C for the cost calculator 406$k$ exemplarily illustrated in FIG. 4, conversion of sales quotes to sales orders and conversion of a sales quote to a sales order invoice as exemplarily illustrated in FIGS. 20A-20E, delivery address validation as exemplarily illustrated in FIGS. 21A-21D, request generation as exemplarily illustrated in FIG. 22, and editing manual sales orders as exemplarily illustrated in FIGS. 23A-23D.

The homepage provided by the sales order data collection and management application (SODCMA) 406 of the sales order data collection and management system (SODCMS) 404 displays the total number of all pending sales orders for any order type, for example, web based sales orders, eBay® sales orders, and manual sales orders as exemplarily illustrated in FIG. 7C. In order to manually approve a pending sales order, a user of the SODCMS 404, for example, a sales managing entity clicks on a pending list of any sales order type. The SODCMS 404 displays a list of pending sales orders for the selected sales order type, for example, eBay® sales orders as exemplarily illustrated in FIG. 14A. The sales managing entity then clicks on one of the sales orders listed under "Order ID". The SODCMS 404 displays a consumer details page for that particular sales order as exemplarily illustrated in FIG. 14B.

The sales order data collection and management system (SODCMS) 404 provides options to approve the sales order or delete the sales order on the GUI 405. When the sales managing entity clicks on the "Approve Order" button on the GUI 405, the SODCMS 404 approves the sales order. If the sales managing entity clicks on the "Delete" button on the GUI 405, the SODCMS 404 deletes the sales order record corresponding to the sales order. If the sales managing entity clicks on the "Approve Order" button, the SODCMS 404 displays an update page as exemplarily illustrated in FIGS. 14C-14D. The update page provides options to update the delivery address, select a part from a dropdown list, select checkboxes, etc. When the sales managing entity clicks on a "Save" button on the GUI 405, the SODCMS 404 approves the sales order and saves the approved sales order. For eBay® sales orders and web based sales orders received via email, the SODCMS 404 displays the approved sales order in the pending sales order list as exemplarily illustrated in FIG. 14E. However, the SODCMS 404 automatically moves such sales orders to the processed sales order list when a scheduler of the SODCMS 404 runs after a configurable time interval, for example, after every 10 minutes. For manual sales orders, the SODCMS 404 immediately marks the approved sales order as processed.

FIGS. 15A-15D exemplarily illustrate screenshots of a graphical user interface (GUI) 405 provided by the sales order data collection and management system (SODCMS) 404 exemplarily illustrated in FIG. 4, for editing configuration settings of the SODCMS 404. The configuration settings that can be edited are, for example, electronic mail (email) settings, timeout settings, storage settings, server settings, mail sender settings, etc. A sales managing entity, for example, an administrator can edit the configuration settings via the GUI 405 as exemplarily illustrated in FIGS. 15A-15D, or manually. In order to edit the configuration settings via the GUI 405, the sales managing entity clicks on a "Settings" option displayed in a header section on the GUI 405 as exemplarily illustrated in FIG. 15A. The header section also provides other options such as links to the homepage, to sign out, manage a comma separated value (CSV), etc., as exemplarily illustrated in FIG. 15B.

When the sales managing entity clicks on an edit settings option on the GUI 405, the sales order data collection and management system (SODCMS) 404 redirects the sales managing entity to an edit settings web form as exemplarily illustrated in FIGS. 15C-15D. The sales managing entity can change the required settings on the edit settings web form and click on the "Update" button to save the changes. To edit the configuration settings manually, the sales managing entity has to change a new configuration field value in a programming script of a system file, for example, a groovy file such as a BootStrap.groovy file of the SODCMS 404. Disclosed below is a portion of a programming script file that can be used for editing the configuration settings manually:

```
ConfigurationBean bean = ConfigurationBean.get(1);
if (bean == null) {
    log.debug "Creating default configurations..."
    //bean = new
ConfigurationBean(host:"pop.gmail.com",port:995,userName:
"abc.sales.test@gmail.com",password:"AbcXyz",sleepTime:600
    bean = new
ConfigurationBean(host:"pop.gmail.com",port:995,userName:
"abcorders@gmail.com",password:"pqrs0000",sleepTime:600000,time0
    bean.save(flush:true);
    log.debug "Done creation of default configuration..."
}
```

In an embodiment, the sales order data collection and management system (SODCMS) 404 provides an option to change database settings associated with different types of sources by editing specific fields in a programming script of a system file, for example, a datasource.groovy file of the SODCMS 404. The fields of the programming script file that can be edited are, for example, a "dbCreate" field for setting an option to create, update, or validate the databases 407 exemplarily illustrated in FIG. 4, a uniform resource locator (URL) field for setting the database URL, a username field for setting the database username, and a password field for setting the database password. Disclosed below is a module of the programming script file showing environment specific settings:

```
// environment specific settings
environments {
    development {
        dataSource {
            dbCreate = "update" // one of 'create', 'create-drop', 'update',
'validate', ' '
            url =
"jbdc:mysql://localhost/sales_order_test?useUnicode=
yes&characterEncoding=UTF-8"
            username = "root"
            password = "root"
        }
    }
}
```

Figure 16A:
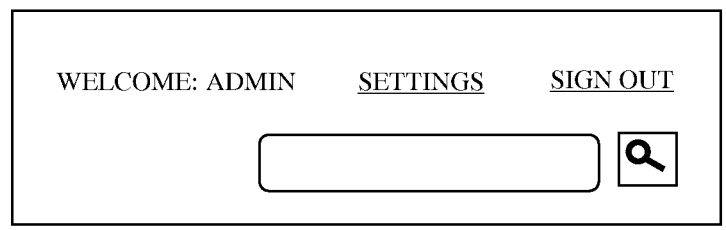
Figure 16B:

FIGS. 16A-16C exemplarily illustrate screenshots of a graphical user interface (GUI) 405 provided by the sales order data collection and management system (SODCMS) 404 exemplarily illustrated in FIG. 4, showing search options for searching sales order data based on content. The SODCMS 404 provides content based search options on fields, for example, a sales order number, a sales order date, a buyer name such as a username or a consumer name, a user identity such as an eBay® provided username, a suburb, a street, a state, a country, an electronic mail (email) address, etc. A sales managing entity can perform a search by entering a field value in a search filter box on the GUI 405 as exemplarily illustrated in FIG. 16A. When the sales managing entity enters the field value in the search filter box, the SODCMS 404 displays a list of search results as exemplarily illustrated in FIGS. 16B-16C.

FIG. 17 exemplarily illustrates a screenshot of a graphical user interface (GUI) 405 provided by the sales order data collection and management system (SODCMS) 404 exemplarily illustrated in FIG. 4, for printing sales order data. As soon as a sales order invoice is created by a sales managing entity, for example, the administrator, the SODCMS 404 automatically prints the created sales order invoice. The SODCMS 404 also provides options to reprint the sales order invoice and a sales quote by using a "Print Quote" button provided on the GUI 405 as exemplarily illustrated in FIG. 17.

Figure 18A:

FIGS. 18A-18B exemplarily illustrate screenshots of a graphical user interface (GUI) 405 provided by the sales order data collection and management system (SODCMS) 404 exemplarily illustrated in FIG. 4, showing an auto-complete feature provided by the SODCMS 404 during creation of a manual sales order. In an example, the SODCMS 404 provides an auto-complete feature on a full name field. When a sales managing entity starts typing a name, the SODCMS 404 suggests a number of options having text that is typed by the sales managing entity, for automatically completing the full name field. The SODCMS 404 provides suggestions based on previously added sales order records. These suggestions facilitate creation of a new sales order for an already existing consumer who has previously purchased products. If the consumer's name is displayed in the auto-complete list, then the sales managing entity does not have to refill the consumer's personal and postal details. For example, as exemplarily illustrated in FIG. 18A, if the sales managing entity selects a record for "Mr. ABC", the SODCMS 404 automatically fills out his personal details such as company name, electronic mail (email), phone number as well as his buyer address and delivery address as exemplarily illustrated in FIG. 18B.

FIGS. 19A-19C exemplarily illustrate screenshots of a graphical user interface (GUI) 405 provided by the sales order data collection and management system (SODCMS) 404 exemplarily illustrated in FIG. 4, for calculating shipping costs. In a delivery address section on the GUI 405, if a sales managing entity enters a delivery country, for example, Australia, and a valid delivery post code, then the SODCMS 404 automatically calculates shipping costs using the cost calculator 406k exemplarily illustrated in FIG. 4, and displays the calculated shipping costs on the GUI 405 as exemplarily illustrated in FIG. 19A. The SODCMS 404 calculates the shipping cost according to a total weight of products bought and a postal code. The shipping cost also depends on a shipping type. The SODCMS 404 provides two modes for shipping, for example, a standard mode via normal post and an express mode via speed post. For a standard shipping mode, the SODCMS 404 facilitates sending the sales order via post. For an express shipping mode, the SODCMS 404 facilitates sending the sales order through a high speed mechanism. Consider an example where the total weight of products bought in the sales order is 11 kilograms (Kg) and the postal code is 2223. The cost calculator 406k calculates the shipping cost for posting the sales order via the standard mode as 15.33 Australian dollars (AUD) as exemplarily illustrated in FIG. 19B. The cost calculator 406k calculates the shipping cost for posting the sales order via the express mode as 54.08 AUD as exemplarily illustrated in FIG. 19C.

FIGS. 20A-20E exemplarily illustrate screenshots of a graphical user interface (GUI) 405 provided by the sales order data collection and management system (SODCMS)

404 exemplarily illustrated in FIG. 4, for converting sales quotes into sales orders and sales order invoices. To convert a sales quote into a sales order, a sales managing entity can click on any sales quote whose sales order is not yet created and then click on a "Create Sales Order" button exemplarily illustrated in FIG. 20A, on the GUI 405. The SODCMS 404 performs the required conversion as exemplarily illustrated in FIGS. 20B-20C. To convert a sales quote into a sales order invoice, the sales managing entity can click on any sales quote whose sales order invoice is not yet created and then click on a "Create Invoice" button exemplarily illustrated in FIG. 20D, on the GUI 405. The SODCMS 404 performs the required conversion as exemplarily illustrated in FIG. 20E. The SODCMS 404 enables the sales managing entity to print a sales order invoice after conversion and also sends a copy of the sales order invoice to a consumer, for example, via electronic mail (email).

FIGS. 21A-21D exemplarily illustrate screenshots of a graphical user interface (GUI) 405 provided by the sales order data collection and management system (SODCMS) 404 exemplarily illustrated in FIG. 4, for validating a delivery address associated with a sales order. The SODCMS 404 validates delivery addresses of consumers using an address verification software application, for example, a geocoding application programming interface (API) of Google, Inc., for example, com.google.code.geocoder. The SODCMS 404 passes the delivery address to the geocoding API. The geocoding API returns the status of the address and a formatted address. On the basis of the status and match result of the formatted address and the delivery address, the SODCMS 404 marks the address as valid or invalid adjacent to the "Address Verified" field exemplarily illustrated in FIG. 21A, on the GUI 405. A sales managing entity, for example, the administrator can view a suggested address provided by the geocoding API on the GUI 405 by clicking on a "suggest address" icon exemplarily illustrated in FIGS. 21B-21C, on the GUI 405. If the delivery address is invalid, the SODCMS 404 sends an electronic mail (email) to the consumer to provide a valid delivery address as exemplarily illustrated in FIG. 21D.

FIG. 22 exemplarily illustrates a sample request file associated with a sales order, generated by the sales order data collection and management system (SODCMS) 404 exemplarily illustrated in FIG. 4. When a sales order is completely processed, the SODCMS 404 automatically generates a request file, also referred to as a REQ file, for that particular sales order. If the sales order is an overseas order, for example, an order from anywhere outside Australia, the SODCMS 404 sets the account of the sales order as "OS" representing overseas. The SODCMS 404 sets the account as "CS" for manual sales orders, "WEB" for web based sales orders, and "EBay" for eBay® sales orders. The request file comprises a billing address and a delivery address of a consumer, a date of the sales order, a part number, quantity, a price of the product, etc. The request file also contains transaction comments, for example, a message provided by the consumer at the time of sales order creation. The SODCMS 404 further integrates the generated request file to other systems such as an enterprise resource planning (ERP) system 220 exemplarily illustrated in FIG. 2C, for record keeping.

FIGS. 23A-23D exemplarily illustrate screenshots of a graphical user interface (GUI) 405 provided by the sales order data collection and management system (SODCMS) 404 exemplarily illustrated in FIG. 4, for editing manually generated sales orders. The SODCMS 404 provides editing options for manual sales orders whose payments have not been processed. To edit a manual sales order that is not paid, a sales managing entity, for example, an administrator selects the unpaid manual sales order and clicks on an "Edit Order" button on the GUI 405 as exemplarily illustrated in FIG. 23A. The SODCMS 404 displays an edit page, exemplarily illustrated in FIGS. 23B-23D, for a sales managing entity to update the required fields. The sales managing entity then clicks on an "Update" button on the GUI 405 to save the changes.

It will be readily apparent that the various methods, algorithms, and computer programs disclosed herein may be implemented on computer readable media appropriately programmed for communication devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Fortran, Ruby, Perl®, Python®, Visual Basic®, hypertext preprocessor (PHP), Microsoft® .NET etc. Other object-oriented, functional, scripting, and/or logical programming languages may also be used. The computer program codes or software programs may be stored on or in one or more mediums as object code. Various aspects of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises one or more computer program codes for implementing the processes of various embodiments.

Where databases are described such as the databases 407, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for collecting and managing, sales order data, said method employing a sales order data collection and management system comprising at least one processor configured to execute computer program instructions for performing said method, said method comprising:

receiving said sales order data from a plurality of sources by said sales order data collection and management system, wherein said plurality of sources comprises a web based sales order, a manual sales order, a sales order over a communication device, and a third party consumer to consumer web based sales order, wherein said sales order data collection and management system integrates an application programming interlace (API) for directly receiving said sales order data from said third party consumer to consumer web based sales order, wherein said application programming interface (API) transforms said sales order data within said third party consumer to consumer web based sales order, into data suitable for direct import into an enterprise resource planning (ERP) system;

categorizing said received sales order data by said sales order data collection and management system based on a type of each of said plurality of said sources;

parsing said categorized sales order data by said sales order data collection and management system based on filtering criteria associated with said each of said plurality of said sources, wherein said filtering criteria associated with said each of said plurality of said sources comprise said type of said each of said plurality of sources and formats of said sales order data, and wherein said filtering criteria for said third party consumer to consumer web based sales order is based on shopping cart sales order email format and a request from said application programming interface (API);

storing said parsed sales order data in one or more databases associated with said each of said plurality of said sources by said sales order data collection and management system;

validating said stored sales order data against validation criteria associated with said each of said plurality of said sources by said sales order data collection and management system, comprising:

validating a product part number in a sales order;

verifying an address associated with said sales order, wherein a Google® Maps application programming interface (API) transforms said address data within said third party consumer to consumer web based sales order, into data suitable for search by Google® Maps; and confirming a correct payment for said sales order, and processing said validated sales order data for transmission to a resource management platform by said sales order data collection and management system.

2. The computer implemented method of claim 1, wherein said resource management platform is one of an internal resource management platform developed and managed by said sales order data collection and management system and an external resource management platform accessible to said sales order data collection and management system via a network.

3. The computer implemented method of claim 1, wherein said processing said validated sales order data comprises generating and transmitting a request file associated with said validated sales order data to said resource management platform by said sales order data collection and management system.

4. The computer implemented method of claim 1, further comprising:
defining configurable time intervals by said sales order data collection and management system for receiving one or more of said sales order data from said plurality of said sources; and
periodically accessing a web server via a network at said defined configurable time intervals by said sales order data collection and management system for receiving said one or more of said sales order data.

5. The computer implemented method of claim 1, further comprising allowing a sales managing entity to manually access a web server via a network at periodic time intervals via a graphical user interface provided by said sales order data collection and management system for accessing one or more of said sales order data from said plurality of said sources.

6. The computer implemented method of claim 1, further comprising rendering messages to consumers by said sales order data collection and management system based on said validation of said stored sales order data, wherein said, rendered messages comprise information on modifications and discrepancies associated with said sales order data.

7. The computer implemented method of claim 1, further comprising extracting frequent queries from said received sales order data, automatically executing said extracted frequent queries, and processing responses to said executed frequent queries by said sales order data collection and management system.

8. The computer implemented method of claim 1, further comprising tracking a status of said sales order by said sales order data collection and management system and categorizing said received sales order data based on said status extracted from said received sales order data by said sales order data collection and management system for processing said sales order.

9. The computer implemented method of claim 8, further comprising generating requests for processing said received sales order data by said sales order data collection and management system based on said status extracted from said received sales order data.

10. The computer implemented method of claim 1, further comprising maintaining a spreadsheet of parts variation of each product extracted from said received sales order data by said sales order data collection and management system.

11. The computer implemented method of claim 1, wherein said validation of said stored sales order data by said sales order data collection and management system comprises:
verifying said sales order for one of a single listing and a listing with parts variation of a product against a spreadsheet of parts variation of each product maintained by said sales order data collection and management system; and
generating a request message against an address associated with said sales order requesting a selection of said product with said parts variation by said sales order data collection and management system, if said sales order is for said listing with said parts variation.

12. The computer implemented method of claim 11, further comprising generating a revised invoice to account for a price difference due to said selection of said product with said parts variation and transmitting said revised invoice to a communication device of a consumer by said sales order data collection and management system for receiving additional payment through one or more of a plurality of payment modes from said consumer based on said price difference, wherein said payment modes comprise an electronic currency mode and a physical currency mode, wherein said electronic currency mode comprises one or more of said payment via a cryptocurrency, a debit card, a credit card, an electronic fund transfer, direct credit, direct debit, and internet banking, and wherein said physical currency mode comprises said payment via one or more of cash and a check.

13. The computer implemented method of claim 1, further comprising receiving said validation of one or more of said stored sales order data against said validation criteria from an external validation platform by said sales order data collection and management system.

14. The computer implemented method of claim 1, further comprising receiving a manual validation of one or more of said stored sales order data against said validation criteria from a sales managing entity by said sales order data collection and management system via a key validation interface provided by said sales order data collection and management system.

15. The computer implemented method of claim 1, further comprising generating and communicating an analytics report associated with said sales order data by said sales order data collection and management system to a sales managing entity, wherein said analytics report is configured to report statistics and statuses from said sales order data.

16. The computer implemented method of claim 1, further comprising integrating with an external payment gateway by said sales order data collection and management system for dynamically validating and processing a payment associated with said stored sales order data, received through one or more of a plurality of payment modes based on one of a preliminary invoice extracted from said received sales order data and a revised invoice generated by said sales order data collection and management system, wherein said payment modes comprise an electronic currency mode and a physical currency mode, wherein said electronic currency mode comprises one or more of said payment via a cryptocurrency, a debit card, a credit card, an electronic fund transfer, direct credit, direct debit, and internet banking, and wherein said physical currency mode comprises said payment via one or more of cash and a check.

17. The computer implemented method of claim 1, further comprising receiving a payment confirmation message from an external payment gateway by said sales order data collection and management system for said validation of said stored sales order data against said validation criteria.

18. The computer implemented method of claim 1, further comprising calculating a cost from said sales order associated with said validated sales order data by said sales order data collection and management system for determining a total cost of a product of said sales order.

19. The computer implemented method of claim 1, wherein said sales order data collection and management system is a web browser based system configured to communicate with a web browser accessible by a communication device.

20. The computer implemented method of claim 1, wherein said sources of said sales order data comprise electronic communication sources, electronic commerce sources, and manually documented commerce sources.

21. A sales order data collection and management system for collecting and managing sales order data, said sales order data collection and management system comprising:
 a non-transitory computer readable storage medium configured to store computer program instructions defined by modules of said sales order data collection and management system;
 at least one processor communicatively coupled to said non-transitory computer readable storage medium, said at least one processor configured to execute said defined computer program instructions;
 a data communication module configured to receive said sales order data from a plurality of sources, wherein said plurality of sources comprises a web based sales order, a manual sales order, a sales order over a communication device, and a third party consumer to consumer web based sales order, wherein said sales order data collection and management system integrates an application programming interface (API) for directly receiving said sales order data from said third party consumer to consumer web based sales order, wherein said application programming interface (API) transforms said sales order data within said third party consumer to consumer web based sales order, into data suitable for direct import into an enterprise resource planning (ERP) system;
 a categorization engine configured to categorize said received sales order data based on a type of each of said plurality of said sources;
 a parsing engine configured to parse said categorized sales order data based on filtering criteria associated with said each of said plurality of said sources, wherein said filtering criteria associated with said each of said plurality of said sources comprise said type of said each of said plurality of sources and formats of said sales order data, and wherein said filtering criteria for said third party consumer to consumer web based sales order is based on shopping cart sales order email format and a request from said application programming interface (API);
 one or more databases associated with said each of said plurality of said sources, configured to store said parsed sales order data;
 a validation module configured to validate said stored sales order data against validation criteria associated with said each of said plurality of said sources, said validation of said stored sales order data comprising:
  validating a product part number in a sales order;
  verifying an address associated with said sales order, wherein a Google® Maps application programming interface (API) transforms said address data within said third party consumer to consumer web based sales order, into data suitable for search by Google® Maps; and
  confirming a correct payment for said sales order; and
 a processing module configured to process said validated sales order data for transmission to a resource management platform.

22. The sales order data collection and management system of claim 21, wherein said resource management platform is one of an internal resource management platform developed and managed by said sales order data collection and management system and an external resource management platform accessible to said sales order data collection and management system via a network.

23. The sales order data collection and management system of claim 21, wherein said processing module comprises a request generation module configured to generate a request file associated with said validated sales order data, and wherein said data communication module, in communication with said request generation module, is further configured to transmit said generated request file to said resource management platform.

24. The sales order data collection and management system of claim 21, wherein said data communication module is further configured to define configurable time intervals for receiving one or more of said sales order data from said plurality of said sources, and wherein said data communication module is further configured to periodically access a web server via a network at said defined configurable time intervals for receiving said one or more of said sales order data.

25. The sales order data collection and management system of claim 21, further comprising a graphical user interface configured to allow a sales managing entity to manually access a web server via a network at periodic time intervals for accessing one or more of said sales order data from said plurality of said sources.

26. The sales order data collection and management system of claim 21, wherein said data communication module is further configured to render messages to consumers based on said validation of said stored sales order data, wherein said rendered messages comprise information on modifications and discrepancies associated with said sales order data.

27. The sales order data collection and management system of claim 21, wherein said processing module further comprises a queries management module configured to extract frequent queries from said received sales order data, automatically execute said extracted frequent queries, and process responses to said executed frequent queries.

28. The sales order data collection and management system of claim 21, further comprising a tracking module configured to track a status of said sales order, wherein said categorization engine is further configured to categorize said received sales order data based on said status extracted from said received sales order data for processing said sales order, and wherein said processing module comprises a request generation module configured to generate requests for processing said received sales order data based on said status extracted from said received sales order data.

29. The sales order data collection and management system of claim 21, wherein said validation module is further configured to maintain a spreadsheet of parts variation of each product extracted from said received sales order data, and wherein said validation module is further configured to verify said sales order for one of a single listing and a listing with parts variation of a product against said spreadsheet of parts variation of each product, and wherein said processing module comprises a request generation module configured to generate a request message against an address associated with said sales order requesting a selection of said product with said parts variation, if said sales order is for said listing with said parts variation.

30. The sales order data collection and management system of claim 29, wherein said processing module further comprises an invoice generation module configured to generate a revised invoice to account for a price difference due to said selection of said product with said parts variation, and wherein said data communication module, in communication with said invoice generation module, is further configured to transmit said revised invoice to a communication device of a consumer for receiving additional payment through one or more of a plurality of payment modes from said consumer based on said price difference, wherein said payment modes comprise an electronic currency mode and a physical currency mode, wherein said electronic currency mode comprises one or more of said payment via a cryptocurrency, a debit card, a credit card, an electronic fund transfer, direct credit, direct debit, and internet banking, and wherein said physical currency mode comprises said payment via one or more of cash and a check.

31. The sales order data collection and management system of claim 21, wherein said data communication module is further configured to receive one of said validation of one or more of said stored sales order data against said validation criteria from an external validation platform and a manual validation of one or more of said stored sales order data against said validation criteria from a sales managing entity via a key validation interface.

32. The sales order data collection and management system of claim 21, farther comprising a report generation module configured to generate and communicate an analytics report associated with said sales order data to a sales managing entity, wherein said analytics report is configured to report statistics and statuses from said sales order data.

33. The sales order data collection and management system of claim 21, wherein said processing module is further configured to integrate with an external payment gateway for dynamically validating and processing a payment associated with said stored sales order data, received through one or more of a plurality of payment modes based on one of a preliminary invoice extracted from said received sales order data and a revised invoice generated by an invoice generation module of said processing module, wherein said payment modes comprise an electronic currency mode and a physical currency mode, wherein said electronic currency mode comprises one or more of said payment via a cryptocurrency, a debit card, a credit card, an electronic fund transfer, direct credit, direct debit, and internet banking, and wherein said physical currency mode comprises said payment via one or more of cash and a check.

34. The sales order data collection and management system of claim 21, wherein said data communication module is further configured to receive a payment confirmation message from an external payment gateway for said validation of said stored sales order data against said validation criteria.

35. The sales order data collection and management system of claim 21, further comprising a cost calculator configured to calculate a cost from said sales order associated with said validated sales order data for determining a total cost of a product of said sales order.

36. A computer program product comprising a non-transitory computer readable storage medium, said non-transitory computer readable storage medium storing computer program codes that comprise instructions executable by at least one processor, said computer program codes comprising:
 a first computer program code for receiving sales order data from a plurality of sources, wherein said plurality of sources comprises a web based sales order, a manual sales order, a sales order over a communication device, a third party consumer to consumer web based sales order, and wherein an application programming interface (API) is integrated for directly receiving said sales order data from said third party consumer to consumer web based sales order, wherein said application programming interface (API) transforms said sales order data within said third party consumer to consumer web based sales order into data that is suitable for direct import into an enterprise resource planning (ERP) system;
 a second computer program code for categorizing said received sales order data based on a type of each of said plurality of said;
 a third computer program code for parsing said categorized sales order data based on filtering criteria associated with said each of said plurality of said sources, wherein said filtering criteria associated with said each of said plurality of said sources comprise said type of each of said plurality of said sources and formats of said sales order data, and wherein said filtering criteria for said third party consumer to consumer web based sales order is based on shopping cart sales order email format and a request from said application programming interface (API):
 a fourth computer program code for storing said parsed sales order data in one or more databases associated with said each of said plurality of said sources;
 a fifth computer program code for validating said stored sales order data against validation criteria associated with said each of said plurality of said sources, wherein said validating said stored sales order data comprises:
  validating a product part number in a sales order;
  verifying an address associated with said sales order, wherein a Google® Maps application programming interface (API) transforms said address data within said third party consumer to consumer web based sales order, into data suitable for search by Google® Maps; and
  confirming a correct payment for said sales order; and
 a sixth computer program code for processing said validated sales order data for transmission to a resource management platform.

37. The computer program product of claim 36, wherein said sixth computer program code comprises:
 a seventh computer program code for generating a request file associated with said validated sales order data; and
 an eighth computer program code for transmitting said generated request file to said resource management platform.

38. The computer program product of claim 36, further comprising:
 a ninth computer program code for generating a revised invoice to account for a price difference due to a selection of a product with parts variation; and a tenth computer program code for transmitting said revised invoice to a communication device of a consumer for receiving additional payment through one or more of a plurality of payment modes from said consumer based on said price difference, wherein said payment modes comprise an electronic currency mode and a physical currency mode, wherein said electronic currency mode comprises one or more of said payment via a cryptocurrency, a debit card, a credit card, an electronic fund transfer, direct credit, direct debit, and internet banking, and wherein said physical currency mode comprises said payment via one or more of cash and a check.

* * * * *